(12) United States Patent
Funayama et al.

(10) Patent No.: US 8,670,619 B2
(45) Date of Patent: Mar. 11, 2014

(54) ROBUST INTEREST POINT DETECTOR AND DESCRIPTOR

(75) Inventors: Ryuji Funayama, Kanagawa (JP); Hiromichi Yanagihara, Brussels (BE); Luc Van Gool, Antwerp (BE); Tinne Tuytelaars, Wilsele (BE); Herbert Bay, Zurich (CH)

(73) Assignees: Toyota Motor Europe NV, Brussels (BE); K.U. Leuven Research & Development, Leuven (BE); Eidgenoessische Technische Hochschule Zurich, Zurich (CH)

( * ) Notice: Subject to any disclaimer, the term of this patent is extended or adjusted under 35 U.S.C. 154(b) by 0 days.

(21) Appl. No.: 13/448,562

(22) Filed: Apr. 17, 2012

(65) Prior Publication Data

US 2012/0201466 A1    Aug. 9, 2012

Related U.S. Application Data

(62) Division of application No. 12/298,879, filed as application No. PCT/EP2007/003811 on Apr. 30, 2007, now Pat. No. 8,165,401.

(30) Foreign Application Priority Data

Apr. 28, 2006  (EP) .................................... 06447060

(51) Int. Cl.
G06K 9/46    (2006.01)
G06K 9/66    (2006.01)
G06K 9/40    (2006.01)

(52) U.S. Cl.
USPC .......................................... 382/190; 382/260

(58) Field of Classification Search
USPC .................................................. 382/190, 260
See application file for complete search history.

(56) References Cited

U.S. PATENT DOCUMENTS

| | | | |
|---|---|---|---|
| 6,711,293 | B1 | 3/2004 | Lowe |
| 7,110,602 | B2 | 9/2006 | Krause |
| 8,027,514 | B2 | 9/2011 | Takaki et al. |
| 2009/0238460 | A1 | 9/2009 | Funayama et al. |
| 2010/0303338 | A1 | 12/2010 | Stojancic et al. |
| 2010/0329508 | A1 | 12/2010 | Chen et al. |
| 2011/0164822 | A1 | 7/2011 | Jegou et al. |

FOREIGN PATENT DOCUMENTS

| | | |
|---|---|---|
| JP | 9-251535 A | 9/1997 |
| JP | 2004-287783 A | 10/2004 |

OTHER PUBLICATIONS

Lowe, David G., "Distinctive Image Features from Scale-Invariant Keypoints", International Journal of Computer Vision, Jan. 5, 2004.
Mortensen et al., "A SIFT Descriptor with Global Context", Computer Vision and Pattern Recognition, 2005. CVPR 2005. IEEE Computer Society Conference in San Diego, CA, USA Jun. 20-26, 2005, Piscataway, NJ, USA, IEEE, Jun. 20, 2005, pp. 184-190 (XP010817430).
Lindeberg, T, "Feature Detection With Automatic Scale Selection", International Journal of Computer Vision, Kluwer Academic Publishers, Norwell, US, vol. 30, No. 2, Nov. 1998, pp. 79-116 (XP000800306).

(Continued)

Primary Examiner — John Strege
(74) Attorney, Agent, or Firm — Bacon & Thomas, PLLC

(57) ABSTRACT

A method for operating on images is described for interest point detection and/or description working under different scales and with different rotations, e.g. for scale-invariant and rotation-invariant interest point detection and/or description.

13 Claims, 13 Drawing Sheets

(56) References Cited

OTHER PUBLICATIONS

Bay, H. et al., "Interactive Museum Guide", Proceedings of the International Conference on Ubiquitous Computing, XX, XX, Sep. 11, 2005, pp. 1-4 (XP002400157).

Mikolajczyk et al., "A performance evaluation of local descriptors", IEEE Transactions on Pattern Analysis and Machine Intelligence, IEEE Service Center, Los Alamitos, CA, US, vol. 27, No. 10, Oct. 2005, pp. 1615-1630 (XP002384824).

Yan Ke et al., "PCA-SIFT: a more distinctive representation for local image descriptors", Proceedings of the 2004 IEEE Computer Society Conference on Computer Vision and Pattern Recognition IEEE Comput. Soc Los Alamitos, CA, USA, vol. 2, Jun. 27, 2004, pp. II-506 (XP002451829).

Grabner M et al., "Fast Approximated SIFT", Proceedings of the Asian Conference on Computer Vision, XX, XX, Jan. 13, 2006, pp. 918-927 (XP002400158).

Junqiu Wang et al. "Vision-based Global Localization Using a Visual Vocabulary", Robotics and Automation, 2005. Proceedings of the 2005 IEEE International Conference on Barcelona, Spain, Apr. 18-22, 2005, Piscataway, NJ, USA, IEEE Apr. 18, 2005, pp. 4230-4235 (XP010875389).

Lowe D G, "Object recognition from local scale-invariant features", Computer Vision, 1999. The Proceedings of the Seventh IEEE International Conference on Kerkyra, Greece Sep. 20-27, 1999, Los Alamitos, CA, USA, IEEE Comput. Soc, US, Sep. 20, 1999, pp. 1150-1157 (XP010350490).

Lorenz C et al "A multi-scale line filter with automatic scale selection based on the Hessian matrix for medical image segmentation", Scale-Space Theory in Computer Vision. First International Conference, Scale-Space '97. Proceedings Springer-Verlag Berlin, Germany, 1997, pp. 152-163, ISBN: 3-540-63167-4.

Jiri Hladuvka and Andreas Konig and Eduard Grolier "Exploiting eigenvalues of the Hessian matrix for volume decimation", In the 9th International Conference in Central Europe on Computer Graphics, Visualization, and Computer Vision (WSCG), 2001.

Tony Lindeberg; "Feature Detection with Automatic Scale Selection," International Journal of Computer Vision, V vol. 30, No. 2, pp. 79-116, Nov. 1998.

Communication from Korean Patent Office in corresponding Korean application No. 10-2008/7029098, with English language translation.

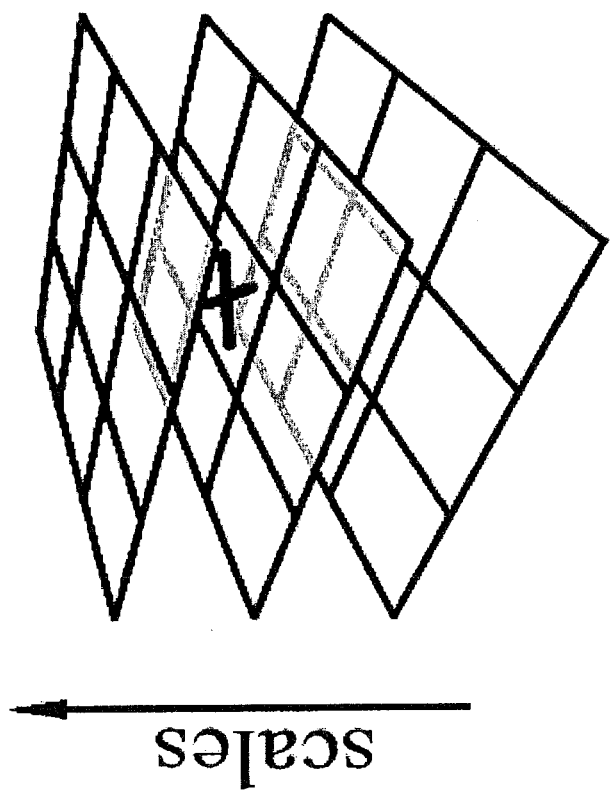

B

A

ROBUST INTEREST POINT DETECTOR AND DESCRIPTOR

FIELD OF THE INVENTION

The present invention relates to methods and apparatus, especially computer based systems, for operating on images, in particular methods and apparatus for interest point detection and/or description working under different scales and with different rotations, e.g. scale invariant and rotation invariant interest point detection and/or description. The present invention also relates to apparatus and method for matching interest points either in the same image or in a different image. The present invention also relates to software for implementing any of the methods of the invention. The present invention also relates to data structures created by multiple filtering operations to generate a plurality of filtered images as well as the filtered images themselves, e.g. as stored in memory or transmitted through a network. The present invention also relates to data structures including descriptors of interest points in one or more images, e.g. a stored in memory or transmitted through a network as well as optionally associating such descriptors with an original copy of the image or an image derived therefrom, e.g. a thumbnail image.

TECHNICAL BACKGROUND

The task of finding correspondences between two images of the same scene or object is part of many computer vision applications. Camera calibration, 3D reconstruction (i.e. obtaining a 3D image from a series of 2D images which are not stereoscopically linked), image registration, and object recognition are just a few. The search for discrete image correspondences can be divided into three main steps. First, 'interest points' are selected at distinctive locations in the image. The most valuable property of an interest point detector is its repeatability, i.e. whether it reliably finds the same interest points under different viewing conditions. Next, the neighbourhood of every interest point is represented by a descriptor. This descriptor has to be distinctive and at the same time robust to noise, detection errors and geometric and photometric deformations. Finally, the descriptors are matched between different images. The matching is often based on a distance between the vectors, e.g. the Mahalanobis or Euclidean distance.

A wide variety of detectors and descriptors have already been proposed in the literature (e.g. [1-6]). Also, detailed comparisons and evaluations on benchmarking datasets have been performed [7-9].

The most widely used interest point detector probably is the Harris corner detector [10], proposed in 1988, and based on the eigenvalues of the second-moment matrix. However, Harris corners are not scale invariant. In [1], Lindeberg introduced the concept of automatic scale selection. This allows detection of interest points in an image, each with their own characteristic scale. He experimented with both the determinant of the Hessian matrix as well as the Laplacian (which corresponds to the trace of the Hessian matrix) to detect blob-like structures. Mikolajczyk and Schmid refined this method, creating robust and scale-invariant feature detectors with high repeatability, which they coined Harris-Laplace and Hessian-Laplace [11]. They used a (scale-adapted) Harris measure or the determinant of the Hessian matrix to select the location, and the Laplacian to select the scale. Focusing on speed, Lowe [12] proposed to approximate the Laplacian of Gaussians (LoG) by a Difference of Gaussians (DoG) filter.

Several other scale-invariant interest point detectors have been proposed. Examples are the salient region detector, proposed by Kadir and Brady [13], which maximises the entropy within the region, and the edge-based region detector proposed by Jude et al. [14]. They seem less amenable to acceleration though. Also several affine-invariant feature detectors have been proposed that can cope with wider viewpoint changes.

An even larger variety of feature descriptors has been proposed, like Gaussian derivatives [16], moment invariants [17], complex features [18, 19], steerable filters [20], phase-based local features [21], and descriptors representing the distribution of smaller-scale features within the interest point neighbourhood. The latter, introduced by Lowe [2], have been shown to outperform the other [7]. This can be explained by the fact that they capture a substantial amount of information about the spatial intensity patterns, while at the same time being robust to small deformations or localisation errors. The descriptor in [2], called SIFT for short, computes a histogram of local oriented gradients around the interest point and stores the bins in a 128-dimensional vector (8 orientation bins for each of 4×4 location bins).

Various refinements on this basic scheme have been proposed. Ke and Sukthankar [22] applied PCA on the gradient image. This PCA-SIFT yields a 36-dimensional descriptor which is fast for matching, but proved to be less distinctive than SIFT in a second comparative study by Mikolajczyk et al. [8] and a slower feature computation reduces the effect of fast matching. In the same paper [8], the authors have proposed a variant of SIFT, called GLOH, which proved to be even more distinctive with the same number of dimensions. However, GLOH is computationally more expensive, as it uses again PCA for data compression. The SIFT descriptor still seems the most appealing descriptor for practical uses, and hence also the most widely used nowadays. It is distinctive and relatively fast, which is crucial for on-line applications. Recently, Se et at. [4] implemented SIFT on a Field Programmable Gate Array (FPGA) and improved its speed by an order of magnitude. However, the high dimensionality of the descriptor is a drawback of SIFT at the matching step.

For on-line applications, each one of the three steps (detection, description, matching) has to be fast. Lowe proposed a best-bin-first alternative [2] in order to speed up the matching step, but this results in lower accuracy.

SUMMARY OF THE INVENTION

An object of the present invention is to provide alternative or improved methods and apparatus for operating on images, in particular methods and apparatus for interest point detection and/or description working under different scales and with different rotations, e.g. for scale-invariant and rotation-invariant interest point detection and/or description. The present invention can provide improved or alternative apparatus and methods for matching interest points either in the same image or in a different image. The present invention can provide alternative or improved software for implementing any of the methods of the invention. The present invention can provide alternative or improved data structures created by multiple filtering operations to generate a plurality of filtered images as well as data structures for storing the filtered images themselves, e.g. as stored in memory or transmitted through a network. The present invention can provide alternative or improved data structures including descriptors of interest points in images, e.g. as stored in memory or transmitted through a network as well as datastructures associating such descriptors with an original copy of the image or an image derived therefrom, e.g. a thumbnail image.

In particular present invention provides: a method for determining an interest point in an image having a plurality of pixels suitable for working at different scales and/or rotations, e.g. a computer based method that determines an interest point in an image automatically, the method comprising: filtering the image using at least one digital filter, and selecting an interest point based on determining a measure resulting from application of the at least one digital filter, the measure being a non-linear combination of the outputs of the at least one digital filter, the measure capturing variations of an image parameter in more than one dimension or direction, the at least one digital filter being a combination of box filters, at least one box filter having a spatial extent greater than one pixel.

Application of the at least one digital filter to the image can be performed with integral images.

The present invention also provides a method for determining an interest point in an image having a plurality of pixels suitable for working at different scales and/or rotations, the method comprising: filtering the image using at least one digital filter, and selecting an interest point based on determining a measure resulting from application of the at least one digital filter, the measure being a non-linear combination of the outputs of the at least one digital filter, the application of the at least one digital filter using integral images.

The at least one digital filter can be a combination of box filters, at least one box filter having a spatial extent greater than one pixel. The combination of box filters can approximate derivatives of a smoothing filter in more than one direction.

A plurality of filtered images at different scales can be provided using the at least one digital filter.

The measure can be a value related to a Hessian matrix such as the determinant of the Hessian matrix constructed from the results of applying the at least one filter.

The application of the at least one filter includes application of several filters such as at least three digital filters.

The at least one digital filter can be derived from the second order derivative of a smoothing filter, e.g. a Gaussian. The digital filter can be a band pass filter, e.g. a second order Gaussain or a Gabor filter.

The at least one digital filter can be applied at different scalings to the image to generate a plurality of filtered images.

An interest point can be determined as a local extreme value of the measure within a neighbourhood including a region of a filtered image. The neighbourhood can be a space defined by at least three of a plurality of filtered images logically arranged in an image pyramid.

Once generated a plurality of images can be stored in memory and the present invention includes data structures in memory storing a plurality of images generated by the methods of the present invention. The present invention also includes an image stored in memory and associated in memory with interest points generated by the methods of the present invention.

The present invention also includes a method for deriving a descriptor of an interest point in an image having a plurality of pixels, the interest point having a location in the image and an orientation, the method comprising:
identifying a neighbourhood around the interest point aligned with the orientation of the interest point, the neighbourhood comprising a set of pixels;
inspecting contrasts in the neighbourhood of the interest point in at least one direction having a fixed relation to the orientation using at least one digital filter to thereby generate first scalar contrast measures for each direction independently, and generating a multidimensional descriptor comprising first elements, each first element being a second scalar contrast measure that is a combination of the first scalar contrast measures from only one direction.

The present invention also includes a method for deriving a descriptor of an interest point in an image having a plurality of pixels, the interest point having a location in the image and an orientation, the method comprising:
identifying a region in a neighbourhood around the interest point aligned with the orientation of the interest point, the neighbourhood comprising a set of pixels; examining tiles of the region, and for each tile generating a contrast related response using at least one digital filter,
summing response values from application of the at least one digital filter in at least two orthogonal directions to generate summed values, and
generating a multidimensional descriptor having first elements, each first element being based on the summed values.

Any descriptor according to the present invention can include a second element, the second element being the sign of the Laplacian at the interest point.

The at least one digital filter extracting contrast responses can be a Haar wavelet filter or other wavelet filter or a Gabor filter or similar.

The first elements of the descriptor can be based on summed absolute values resulting from application of the at least one digital filter in at least two directions.

The present invention also provides a method for deriving a descriptor of an interest point in an image having a plurality of pixels, the interest point having a location in the image and an orientation, and a neighbourhood having been defined around the interest point aligned with the orientation of the interest point, the neighbourhood comprising a set of pixels; the method comprising:
inspecting contrasts in the neighbourhood of the interest point using at least one digital filter,
generating a multidimensional descriptor based on the results of the application of the at least one digital filter and absolute values of these results.

The present invention also includes a method for assigning the orientation of an interest point in an image having a plurality of pixels, the interest point having a location, the method comprising:
identifying a region enclosing the interest point,
determining an orientation for the interest point by:
examining a plurality of tiles of the region, each tile comprising a plurality of pixels, determining for each tile filtered values related to contrast in two directions to thereby determine for that tile an orientation and a magnitude for that orientation, and assigning an orientation to the interest point by selecting the determined orientation with largest magnitude.

A plurality of descriptors may be stored in memory, e.g. they can be used to interrogate archived images. To assist, the plurality of descriptors can be stored in memory associated with the image or images.

The present invention provides a computer based system for determining an interest point in an image having a plurality of pixels suitable for working at different scales and/or rotations, comprising:
means for filtering the image using at least one digital filter, and
means for selecting an interest point based on determining a measure resulting from application of the at least one digital filter, the measure being a non-linear combination of the outputs of the at least one digital filter, the measure capturing variations of an image parameter in more than one dimension or direction, and the at least one digital filter being a combination of box filters, at least one box filter having a spatial extent greater than one pixel.

The means for filtering can be adapted to apply the at least one pass filter to the image using integral images.

The present invention also provides a computer based system for determining an interest point in an image having a plurality of pixels suitable for working at different scales and/or rotations, comprising:

means for filtering the image using at least one digital filter, and means for selecting an interest point based on determining a measure resulting from application of the at least one digital filter, the measure being a non-linear combination of the outputs of the at least one digital filter, the means for selecting applying the at least one digital filter using integral images.

The at least one digital filter is preferably a combination of box filters, at least one box filter having a spatial extent greater than one pixel. The combination of box filters can approximate derivatives of a smoothing filter in more than one direction, e.g. a Gaussian filter.

The means for filtering can provide a plurality of filtered images at different scales using the at least one digital filter.

The measure to be used can be the determinant of a Hessian matrix constructed from the results of applying the at least one filter.

The means for filtering can apply more than two filters, e.g. at least three digital filters or more.

The at least one digital filter is preferably derived from the second order derivative of a smoothing filter, e.g. a Gaussian.

It is convenient to determine an interest point as a local extreme value of the measure within a neighbourhood including a region of a filtered image. The neighbourhood can be a space defined by at least three of a plurality of filtered images logically arranged in an image pyramid.

A memory can be provided for storing the plurality of images and/or the interest points generated.

The present invention provides a system for deriving a descriptor of an interest point in an image having a plurality of pixels, the interest point having a location in the image and an orientation, the system comprising:

means for identifying a neighbourhood around the interest point aligned with the orientation of the interest point, the neighbourhood comprising a set of pixels;

means for inspecting contrasts in the neighbourhood of the interest point in at least one direction having a fixed relation to the orientation using at least one digital filter to thereby generate first scalar contrast measures for each direction independently, and means for generating a multidimensional descriptor comprising first elements, each first element being a second scalar contrast measure that is a combination of the first scalar contrast measures from only one direction.

The present invention also provides a system for deriving a descriptor of an interest point in an image having a plurality of pixels, the interest point having a location in the image and an orientation, the system comprising:

means for identifying a region in a neighbourhood around the interest point aligned with the orientation of the interest point, the neighbourhood comprising a set of pixels; means for examining tiles of the region, and for each tile generating a contrast related response using at least one digital filter, means for summing response values from application of the at least one digital filter in at least two directions to generate summed values, and means for generating a multidimensional descriptor having first elements, each first element being based on the summed values.

Any descriptor according to the present invention can include other elements such as a second element, the second element being the sign of the Laplacian at the interest point.

The at least one digital filter used to obtain contrast related information can be a Haar wavelet filter.

A descriptor in accordance with the present invention can be based on summed absolute values resulting from application of the at least one digital filter in at least two directions.

The present invention provides a system for deriving a descriptor of an interest point in an image having a plurality of pixels, the interest point having a location in the image and an orientation, and a neighbourhood having been defined around the interest point aligned with the orientation of the interest point, the neighbourhood comprising a set of pixels; the system comprising:

means for inspecting contrasts in the neighbourhood of the interest point using a at least one digital filter, and means for generating a multidimensional descriptor having first elements, the first elements being based on the results of the application of the at least one digital filter and absolute values of these results.

The present invention also provides a system for assigning the orientation of an interest point in an image having a plurality of pixels, the interest point having a location, the system comprising:

means for identifying a region enclosing the interest point, means for determining an orientation including:
  means for examining a plurality of tiles of the region, each tile comprising a plurality of pixels,
  means for determining for each tile filtered values related to contrast in two directions to thereby determine for that tile an orientation and a magnitude for that orientation, and
  means for assigning an orientation to the interest point by selecting the determined orientation with largest magnitude.

Each tile can have an apex located at the interest point.

Means for aligning a second neighbourhood around the interest point can be provided with the assigned orientation of the interest point, the neighbourhood comprising a set of pixels; and means for inspecting contrast in the neighbourhood of the interest point using at least one digital filter to generate a descriptor.

The present invention provides a computer program product comprising software code which when executed on a computing system implements any method according to the present invention or any image or system in accordance with the present invention. A computer readable storage medium can be provided for storing the computer program product.

An aim of the present invention is to develop a detector and/or descriptor, whereby each (or both) is (or are) quick to compute, while not sacrificing performance, The present invention provides interest point detection and/or description either individually or a combination. Furthermore, the present invention can provide matching of an interest point in one image and the same interest point in another image, e.g. a matching step of the descriptor of an interest point from a first image with a descriptor of interest points of a second image or the same image to identify the same interest point in the first and second images, or to identify the most distinctive interest points in one image.

The present invention also provides software for implementing any of the methods of the invention. The present invention also provides data structures created by multiple filtering operations to generate a plurality of filtered images as well as the filtered images themselves, e.g. a stored in memory or transmitted through a network.

The present invention strikes a balance between having a low dimensionality and complexity of the descriptor, while keeping it sufficiently distinctive.

The present invention can provide the advantage of outperforming previously proposed schemes with respect to repeatability, distinctiveness, and robustness, yet can provide interest points and/or descriptors that can be computed and compared faster. The dimension of the descriptor has a direct impact on the time it takes to identify an interest point from one image in another image, and lower numbers of dimensions are therefore desirable. Also for feature clustering, lower dimensions are preferred. The present invention provides a descriptor with a good level of distinctiveness for a given number of dimensions.

Another aspect of the present invention is using integral images for image convolution for fast computation of a descriptor and/or a detector. Yet another aspect of the present invention is using a measure that captures variations of an image parameter in more than one dimension or direction. The image parameter can be any image-related value associated with pixels, e.g. grey scale value, hue, depth value of a range image intensity, etc. The measure is a result from application of at least one digital filter to the image and the measure can be a non-linear combination of the outputs of the at least one digital filter. The measure is preferably an at least approximate Hessian matrix-based measure. Such a measure can be the determinant or the Laplacian of the Hessian matrix. Another aspect of the present invention is the use of at least one digital filter approximating derivatives of a smoothing filter in more than one direction, e.g. the at least one digital filter approximating derivatives of a smoothing filter in more than one direction by a combination of box filters, at least one box filter having a by a combination of box filters, at least one box filter having a spatial extent greater than one pixel. Another aspect of the present invention is the use of a digital band pass filter, e.g. based on an approximated second order derivative of a Gaussian or a Gabor filter. Still another aspect of the present invention is a distribution-based descriptor. Another aspect of the present invention is the use of the type of contrast (e.g. by using the sign of the Laplacian) of the interest point in the descriptor, e.g. in order to increase the speed of the matching step. Another aspect is orientation assignment of an interest point by examining a plurality of contiguous areas or volumes of a scale space. Another aspect of the present invention is a descriptor for an interest point based on sums of signed (directed) image contrast values.

BRIEF DESCRIPTION OF THE FIGURES

FIG. 4B shows a detail of the local neighbourhood both within an image and across scales where the maximum of the measure such as the approximate determinant of the Hessian matrix is determined.

DESCRIPTION OF THE ILLUSTRATIVE EMBODIMENTS

Figure 1:
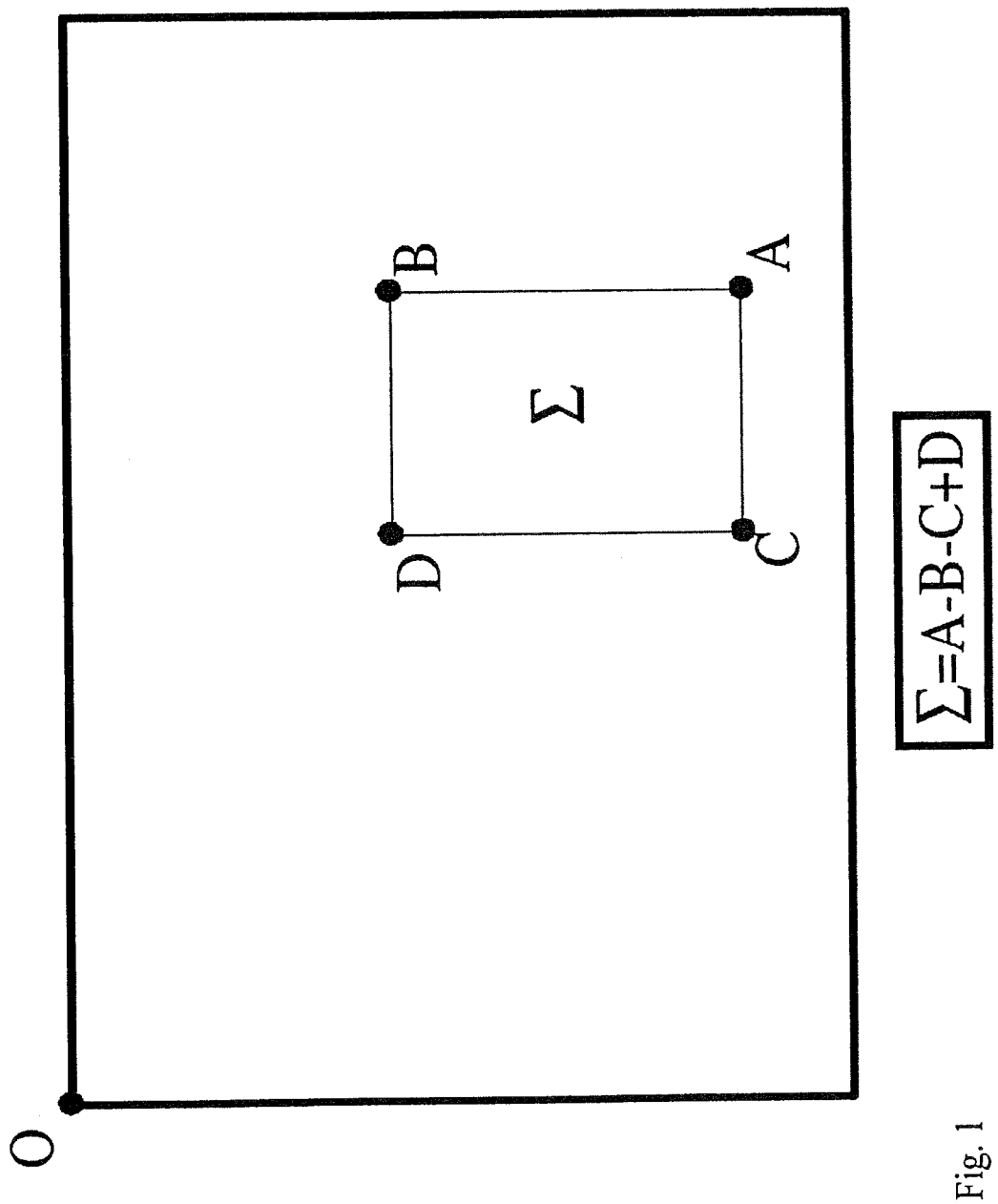
FIG. 1 shows how to calculate integral images which can be used with the embodiments of the present invention. A, B, C and D are themselves sums of all values within upright rectangles spanned by the origin (top left corner) and the point indicated.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn to scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

The present invention relates to the processing of digital images which will be described as being logically organised in columns and rows of pixels (picture elements). "Logically organised" means that each pixel may be addressed via a row and column, e.g. along x- and y-direction. However, the rows and columns of pixels need not be physically in a Cartesian array; for example, they could be in a polar image. In the case of a polar image the present invention can be applied directly to the polar image or the transforms between Cartesian and polar coordinates can be respected when generating the digital filters. Whatever form of the image, it is assumed that the pixels of the image can be addressed and manipulated individually. The present invention will mainly be described with reference to 2D images but the present invention may be extended to 3D solid images, or spatio-temporal domains (video). Also the present invention will mainly be described with reference to grey scale images or black and white images but the present invention is not limited thereto. The present invention also applies to colour images. Colour images are usually made up of a number of colour separations, e.g. three (for example red, green, blue or cyan, magenta, yellow) or four colour separations, e.g. cyan, magenta, yellow and black. Different colour separations in an image may also be described as separate colour channels. There are numerous ways the present invention may be applied to colour images. One method of applying the present invention is to change the coloured image to a grey scale image and apply the present invention to that image. Another method of applying the methods is to use a single colour separation or colour channel. Another way is to combine, e.g. add or any other kind of combining, the pixel values together for all of the colour separations or channels to thereby obtain a single average value or total value for each pixel.

The present invention refers to "pixels" of an image. This term relates to a position in an image having values which represent aspect of an image element to be displayed, e.g. luminosity, hue, etc. The images used with the present invention may be upsampled or downsampled at any time. Hence the term "sample" may also be applied for any discrete part of an image which is used in the present invention whether it is displayed or not. The term "pixel" may therefore be replaced with "sample" in any part of this application and in the appended claims.

The present invention provides a detector for determining an interest point in an image having a plurality of pixels suitable for working at different scales and/or rotations, whereby the image is filtered using at least one digital filter, and an interest point is selected based on determining a measure resulting from application of the at least one digital filter, the measure being a non-linear combination of the outputs of the at least one digital filter. The at least one digital filter approximates derivatives of a smoothing filter in more than one direction. The measure captures variations of an image parameter in more than one dimension or direction. The image parameter can be any suitable value assigned to pixels of an image such as intensity, grey scale value, hue, depth value of a range image, etc.

Preferably, the detector is a Hessian-based detector although the present invention is not limited thereto. Hessian-based detectors are more stable and repeatable than their Harris-based counterparts. The measure can be any suitable measure derived from the Hessian matrix, e.g. the determinant or the trace or a combination of the two. Using the determinant of the Hessian matrix rather than its trace (i.e. the Laplacian) seems advantageous, as it fires less on elongated, ill-localised structures.

The methods of the present invention have three independent and stand-alone steps which can be combined in any combination or used alone with other methods. First, 'interest points' are selected automatically at distinctive locations in an image by digital filtering of an image. Interest points can be corners, blobs, and T-junctions, for example. Next, the neighbourhood of every interest point is represented by a descriptor, e.g. in the form of a feature vector. The descriptor is distinctive and at the same time robust to noise, to errors in locating interest points and geometric and photometric deformations. Finally, the descriptors are matched between different images or within the same image, e.g. the descriptor feature vectors are matched. The matching can be based on an l2 distance between the descriptors such as a distance between descriptor feature vectors, e.g. the Mahalanobis or Euclidean distance. The matching can also be based on a l1 distance or l∞ distance, or any other distance measure. Any one of these steps can be combined with an alternative other step. Hence, the descriptor of the present invention can be used with other interest point detectors or the interest point detector of the present invention can be used with other known descriptors.

When working with local features, a first issue that needs to be settled is the required level of invariance. Clearly, this depends on the expected geometric and photometric deformations, which in turn are determined by the possible changes in viewing conditions. The present invention provides interest point detectors and/or descriptors that work under different rotations and/or scalings, e.g. are scale invariant and/or image rotation invariant detectors and/or descriptors. They offer a good compromise between feature complexity and robustness to commonly occurring deformations. Skew, anisotropic scaling and perspective effects are assumed to be second-order effects. They are covered to some degree by the overall robustness of the descriptor. Concerning the photometric deformations, the present invention assumes a simple linear model with a bias (offset) and contrast change (scale factor). The detector and/or descriptor uses grey scale images and do not need to use colour.

In the following a a detector according to an aspect of the present invention is described based on the Hessian matrix of one or more filtered versions of an image and particularly on the use of the determinant of the Hessian matrix. Preferably this is approximated to reduce complexity. Preferably, integral images are used to reduce the computation time.

A descriptor according to the present invention describes a distribution of contrast information within the interest point neighbourhood. The descriptor works directly on the distribution of contrasts in two directions, e.g. two orthogonal directions that need not be the same directions as the columns and rows of the image. The descriptor makes use of a scalar contrast measure. The scalar contrast measure is obtained by comparing an image parameter from neighbouring areas, e.g. pixels or groups of pixels, of the image. Contrast is a change in an image parameter, e.g. intensity or any other value assigned to a pixel of an image. By making combinations of these scalar contrast measures elements of the descriptor are generated.

Optionally the method exploits integral images for speed, and preferably uses a limited number of dimensions, e.g. 30 to 150 dimensions for the descriptor. This yields a robust and distinctive descriptor, which is still relatively small and therefore faster to match and can be better suited for clustering than an equally distinctive state-of-the-art descriptor. A larger number of dimensions is included within the scope of the present invention but more dimensions can over-determine the neighbourhood which brings the risk of a lower matching rate in presence of viewpoint or viewing condition changes.

The present invention can also make use of indexing based on the Laplacian, e.g. the sign of the Laplacian, which increases not only the robustness of the descriptor, but also the matching speed. Other measures can be used provided they distinguish interest points of different contrast type.

Integral Images

One aspect of the present invention is to use integral images, e.g. as defined by [23] and shown schematically in FIG. 1. They allow for the fast implementation of box type convolution filters. This method will be applied at several places within the inventive methods and is therefore explained once at this point. The starting point is an at least two-dimensional digital image I with image values at a plurality of pixels in the x and y directions. The entry of an integral image $I_\Sigma(x)$ at a location $x=(x, y)$ represents the sum of all pixels in the input image I of a region formed by the origin and x. Thus the integral image $I_\Sigma(x)$ is the sum of a pixel values at the image points $I(i,j)$ over a region of the image having the origin as an extreme point thereof. This region can be a rectangular region, in which case:

$$I_\Sigma(x) = \sum_{i=0}^{i \leq x} \sum_{j=0}^{j \leq y} I(i, j). \tag{1}$$

Once the integral image has been computed, it takes four additions to calculate the sum of the intensities over any upright, rectangular area. Moreover, the calculation time is independent of its size.

Although, integral images have been described with reference to rectangular parts of an image other shapes can be used, e.g. triangular or hexagonal, and the digital filters of the present invention may be adapted in their form to be easily processed by such integral images.

Interest Point Detection

Hessian Determinants and the Image Pyramid

The detector will first be described on one scale, and then the method is expanded to multiple scales. A detector in accordance with the present invention is based on the Hessian matrix because of its good performance in computation and accuracy. However, rather than using a different measure for selecting the location and the scale the present invention relies on the determinant or the approximate determinant of the Hessian for both location and scale. Given a point $x=(x, y)$ in an image I, the Hessian matrix $H(x,\sigma)$ in x at scale $\sigma$ is defined as follows:

$$H(x, \sigma) = \begin{bmatrix} Lxx(x, \sigma) & Lxy(x, \sigma) \\ Lxy(x, \sigma) & Lyy(x, \sigma) \end{bmatrix} \tag{2}$$

where $Lxx(x,\sigma)$ is the result of applying a digital filter in the point x, etc. The subscript xx refers to applying a second order derivative of a smoothing filter. The subscript xy refers to applying second order derivative of a smoothing filter whereby the first derivative is in one direction and the second derivative is in another. The basic smoothing filter is preferably bell shaped like a Gaussian. The bell shape has the advantage that pixels further away from the point x have less effect on the filtered value assigned to a pixel. The second order digital filters in accordance with the present invention have at least one of the following characteristics:

a) they are digital filters related to a second order derivative of a smoothing filter
b) they are digital filters related to the second order derivative of a bell shape
c) they are filters based on the second order derivative of a Gaussian
d) they are discretised filters
e) they are cropped filters
f) they have lobes defined by discrete subregions of the digital filters
g) they are box filters
h) the lobes of the subregions can be "top hat" or "square pulse" in shape
i) at least one of the filters is a band pass filter.

For example, the $Lxx(x,\sigma)$ is the result of convolution of the Gaussian second order derivative $$\frac{\partial^2}{\partial x^2} g(\sigma)$$

(or an approximation thereof) with the image I in point x, and similarly Lxy(x,σ) and Lyy(x,σ) are the result of convolution of the Gaussian second order derivative $$\frac{\partial^2}{\partial x \partial y} g(\sigma) \text{ and } \frac{\partial^2}{\partial y^2} g(\sigma)$$

(or approximations thereof) with the image I in point x, respectively. The filter Lxy(x,σ) is related to Lyx(x,σ) and the one can be derived from the other so that only three digital band pass filters need be applied to the image to generate the four filtered images. Gaussians are optimal for scale-space analysis but in practice they cannot be allowed to be infinitely large and have to be discretised and cropped. After such approximations band pass filters are obtained as shown schematically in FIGS. 2A and 2B. The value of the filter at each pixel point has been coded in grey scale. Grey is the value zero. Black is a negative value and white is a positive value. As can be seen, the filter has only one value for each pixel, i.e. the continuous function such as the second derivative of a Gaussian is discretised to values valid for the whole of the area of one pixel of the image. Also the spatial extent has been reduced from infinity to a number of pixels, e.g. mask sizes of M×M pixels centred on the interest point. The values for M are preferably odd in order to provide a central pixel. M=9 (9×9 mask) is an often used value. Other values are M=11, M=13, M=15, etc. For traditional convolution methods, this size influences the computation speed. The bigger M, the slower the convolution of the whole image with that mask. However in accordance with an embodiment of the present invention the use of integral images, results in any filter size being applied at constant speed.

Despite the fact that discretisation and cropping are supposed to lead to a loss in repeatability under image rotations, in fact the band pass filters used in accordance with the present invention work. Gaussians have a form of a bell shape, and second order derivatives of Gaussians have one central lobe and two outer lobes of the opposite sign. As can be seen from FIG. 2A a discretised and cropped second order derivative of a Gaussian digital filter, where the derivative is taken twice in the x-direction, has negative values at the central pixel, i.e. it has a negative lobe about the central pixel and makes two zero crossings above and below the central pixel, then goes positive, i.e. one positive lobe is formed above and below the central pixel. The filter goes then to zero, i.e. it is truncated after a certain number of pixels such as at the fourth pixel from the central pixel. Thus, this digital filter has a central lobe of one binary polarity, two zero crossings and two outer lobes of the opposite binary polarity and a spatial extent of plus and minus a certain number of pixels, e.g. three pixels from the central pixel. They filter is similar but rotated through 90°. In FIG. 2B the xy filter is shown schematically. The central pixel has a value such as a zero value and there are two positive lobes in the positive x-positive y and negative x-negative y quadrants (along a diagonal). There are two negative lobes in the positive x-negative y and negative x-positive y quadrants (along the other diagonal). The fact that the centre pixel has a value that is not included in one of the lobes, e.g. box filters and the centre of the filter is not formed by the join of contiguous vertices of box filters means that the type of filter shown in FIG. 2*b* differs from the type of filter shown in FIGS. 2*a, c* and *e*.

To digitally filter the image, the digital filters as shown in FIGS. 2A and B and a rotated version of 2A (or as shown in FIGS. 2C, D, E—see below) are used to calculate a new value for each pixel centred on that pixel and this is repeated for some or all pixels to generate a filtered image. Values may be calculated at regularly spaced pixels, where the steps between these pixel samples are chosen as to obey the Nyquist sampling theorem.

In accordance with a further aspect of the present invention, the approximation of derivatives of a smoothing filter, such as a Gaussian filter, to form at least one band pass filter is preferably taken even further by the use of digital filters with discrete subregions. These sub-regions are discrete regions of filter values, typically arranged at least diametrically symmetrically around the central pixel e.g. in the form of a combination of box filters as shown in FIGS. 2C, D and E. These boxes either have a single positive value or a single negative value extending over a certain number of pixels greater than one. Accordingly, bell shaped lobes have been replaced by "top hat" or "square pulse" lobes. In FIG. 2C there are N blocks, e.g. three blocks, and the values are +1 for the white pixels and −2 for the black pixels and these filters are used for they and x directions, respectively. The subregions of the filter are shown as boxes that are square or rectangular but other shapes are included within the scope of the present invention, e.g. quadratic, castellated square or quadratic, castellated hexagonal, castellated circular, triangular, hexagonal, etc. Sub-region shapes which allow use of integral image processing are particularly preferred in the present invention. Combinations of box filters are particularly easy to process with integral images of the type shown in FIG. 1. In FIG. 2D the xy filter is shown having values in N' pixel blocks, e.g. four pixel blocks with either +1 (white) or −1 (black) arranged symmetrically around a central pixel with a filter value, e.g. a filter value of zero. The fact that the centre pixel has a value that is not included in one of the lobes, e.g. in the box filters and the centre of the filter is not formed by the join of contiguous vertices of box filters means that the type of filter shown in FIG. 2*d* (like FIG. 2*b*) differs from the type of filter shown in FIGS. 2*a, c* and *e*. Also the centre value can be zero which is different from the values of the box filters which can be plus or minus 1. Hence this filter is a ternary (−1, 0, 1) digital filter whereas the other filters are binary filters. Accordingly one aspect of the present invention is that at least one of the filters (e.g. as shown in FIGS. 2*a* to *e*) is a ternary filter or higher filter e.g. quaternary. A way of expressing this is that the centre of at least one of these digital filters is a pixel having a value that is not a value of one of the lobe of box filters located symmetrically on either side.

The present invention is not limited to three blocks for the x and y filters and four blocks for the xy (and yx) filters. Other numbers of blocks can be used.

The above description relates to box filters but the present invention is not limited thereto. Filter values within each block or box can be non-integral (as shown schematically in FIGS. 2A and B) although this prevents use of integral images. Also the filter values may vary within a block or from block to block. However, the more blocks and the more values, the more computationally intensive is the filter.

Common features of the filters of FIGS. 2C to E are as follows:
a) the xy filter (and yx filter) has only one lobe in one diagonal direction going from the centre pixel position with a zero value at the centre pixel. Hence there are only two lobes along a diagonal direction—one in one diagonal direction and one in the opposite direction. Both increase from the central zero value and then decrease to zero again. The two lobes along any diagonal have the same polarity, both having positive values or both having negative values. The polarity of the lobes in one diagonal direction is opposite to the polarity of the lobes along the other diagonal.
b) The x and y filters have a single lobe centred on the centre pixel and decaying to a zero value on either side along the x or y axis depending upon which filter direction is involved, together with two lobes of opposite sign, one on each side of the central lobe.
c) For all the filters the total sum of all filter values for the filter is zero.
d) Optionally the filter values are integers.
e) Optionally the filter values in one lobe are all the same— the lobe values are "top hat", i.e. rectangular, in shape.

These filters based on approximate second order Gaussian derivatives and comprising a combination of box filters as exemplified in FIGS. 2C, D and E can be evaluated very quickly using integral images, independently of size, i.e. independent of their spatial extent. Their performance is comparable or even better than with the discretised and cropped filters as shown in FIGS. 2A and 2B although the present invention includes the use of these filters as well. The combination of box filters has a spatial extent of P×P, e.g. a 9×9 filters as shown in FIGS. 2C and 2D and are approximations derived from a Gaussian, e.g. with σ=1.2. These 9×9 combinations of box filters can be used as the lowest scale filter, i.e. highest spatial resolution filter. These filters will be denoted by Dxx, Dyy, and Dxy. Other suitable values for P include any odd number. Although 9×9 is a useful smallest filter size, smaller filters can be used with the present invention, e.g. 3×3 is useful, in fact any filter size divisable by three. For higher scales, the filter sizes are increased in order to cover a larger image region. The filter size can theoretically be up to the size of the image itself. In accordance with one embodiment of the present invention the ratio between P and the standard deviation of the approximated Gaussian function for all filter sizes is constant. For example, this ratio can be set to 7.5 (9/1.2), but different values can also be considered, provided they are constant for one scale analysis.

The weights applied to the rectangular regions can be kept simple for computational efficiency. Preferably, the relative weights in the expression for the Hessian's determinant need to be balanced. This may be done as defined by the following generic formula:

$$\frac{|Lxy(\sigma)|_F |Dxx/yy(P)|_F}{|Lxx/yy(\sigma)|_F |Dxy(P)|_F} \quad (3)$$

where $|x|_F$ is the Frobenius norm
For the particular case above P is 9 and σ is 1.2 so the result is:

$$\frac{|Lxy(1.2)|F|Dxx/yy(9)|F}{|Lxx/yy(1.2)|F|Dxy(9)|F} = 0.912$$

(or in other words about 0.9), where $|x|_F$ is the Frobenius norm. This yields the approximate determinant of the Hessian (see equation 2) as:

$$\det(H_{approx}) = DxxDyy - (0.9Dxy)^2 \quad (4)$$

If the values of P and/or σ change then this approximate formula will change.

The approximated determinant of the Hessian $\det(H_{approx})$ is calculated for some or each pixel (or sample) of the image and a value of $\det(H_{approx})$ at location x represents a point of interest measure or blob response in the image at location x. These responses are stored in a blob response map. To find a point of interest local maxima of $\det(H_{approx})$ are detected as will be explained later.

Figure 3:
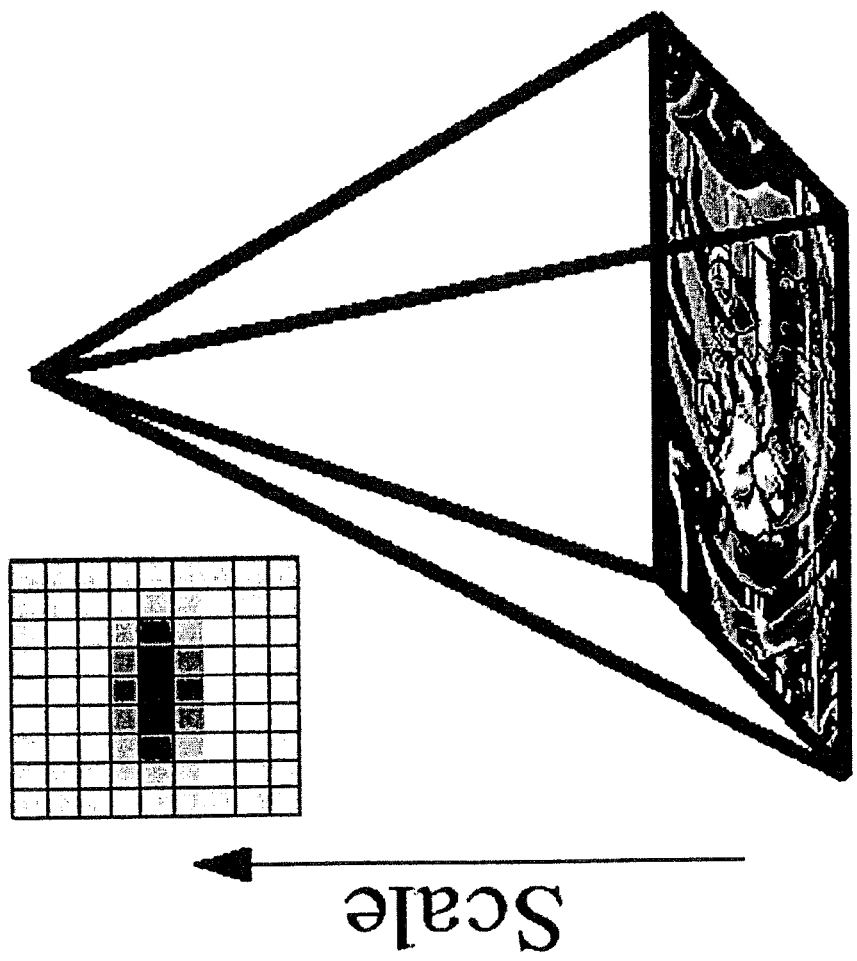
FIG. 3 is a schematic representation of an image pyramid that can be used with embodiments of the present invention.

In the above description only one scale of the filters has been described. Interest points can be found in a single filtered image or at different scales. Using a plurality of filtered image is useful because the search of correspondences between different images often requires their comparison in images where the correspondences are present at different scales. Scale spaces are preferably implemented as an image pyramid. An image pyramid is a series of filtered images notionally placed one above the other, whereby as the pyramid is traversed from bottom to top the images are filtered with ever larger band pass filters such as the filters derived from the second order derivative of Gaussian filters (or the approximations of such filters as described above) as shown schematically in FIG. 3. The larger the bandpass filter, the more it probes for lower frequencies in the original image. There are various possibilities for forming the pyramid of filtered images. At least three possibilities are included within the scope of the present invention.
 a) each new image is a subsampled version of the previous image and the band pass filter size is kept the same.
 b) each new image has the same size and the filter size is increased. For example the image may be the original image or a subsampled or upsampled version of that image.
 e) each new image is a subsampled version of the previous image and the band pass filter size is also increased.
Combinations of any of a) to e) above can be used as well for different parts of the pyramid.

For example, the images can be repeatedly filtered by applying the same filter to the output of a previously filtered layer, e.g. using the same or a different band pass filter. Pyramid layer subtraction, i.e. the subtraction of one layer of the pyramid from another, e.g. an adjacent layer, yields DoG images where edges and blobs can be found. Although for the creation of this pyramid, the Gaussian kernel has been shown to be the optimal filter [24], in practice, however, the Gaussian needs to be modified. It needs to be discretised and cropped, and even with Gaussian filters aliasing still occurs as soon as the resulting images are sub-sampled. Also, properties like that no new structures may appear while going to lower resolutions may have been proven in the 1D case, but are known not to apply to the relevant 2D case [26]. Despite, the theoretical importance that experts in this field place on the Gaussian in this regard, a detector in accordance with an embodiment of the present invention is based in a simpler alternative. Surprisingly, good results are obtained. The present invention is not limited to filters based on a Gaussian smoothing filter.

Figure 4A:
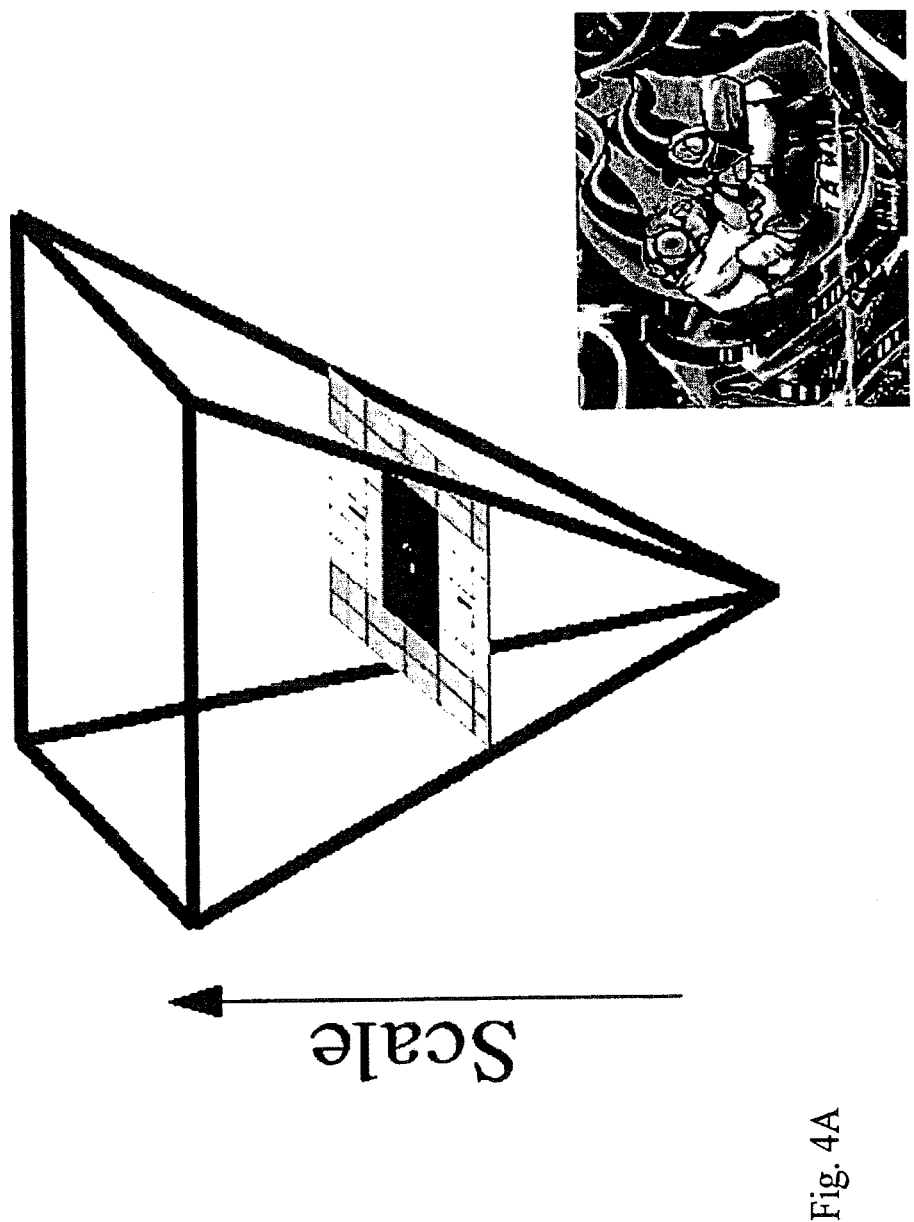
FIG. 4A shows an embodiment of the present invention in which the scale space is analysed, by increasing the digital filter size and applying it on the original input image.

Accordingly, an embodiment of the present invention includes generating scale space by application of simple combinations of box filters after which the scale space is analysed. These convolution filters approximate second order derivatives of a smoothing filter, e.g. the second Gaussian derivatives at different scales, by summing intensities over boxes of the filters as explained above with reference to FIG. 2. Again, integral image processing is used and such filters are evaluated extremely rapidly. Also, instead of having to iteratively apply the same filter to the output of a previously filtered layer, an embodiment of the present invention applies such filters of any size (and differing sizes) on the original image. This can be done at exactly the same speed independent of size by use of integral images. The filtering of the same image using different filter scales can optionally be done in parallel, e.g. where a parallel processor network is used, e.g. to save time. In this embodiment, instead of decreasing the image size in order to get to the next scale level, the filter size is increased as shown schematically in FIG. 4A. Due to the computational efficiency of the integral images, filters of any size on the image without significant loss in computational speed. Therefore, it is preferred to increase the filter size (embodiment of FIG. 4A) rather than repeatedly reducing the image size (embodiment of FIG. 3). One further advantage is that as the same image is processed with filters at different scalings, the value of the determinant as determined, e.g. by Equation (4) can be written in the image as the pixel value at that point. Hence, the operation of the box filters is to generate a new image where each pixel or sample has a value that is at least the approximate value of the determinant of the Hessian. These new images are then arranged logically above each other to form a scale space (see FIG. 4A). Thus, in, accordance with this embodiment three band pass filters are applied to an original image to generate one new image which now comprises at least approximate values of the determinant of the Hessian matrix of the pixel values and this is repeated for different scalings of the filter to generate a plurality of filtered images.

Figure 2:
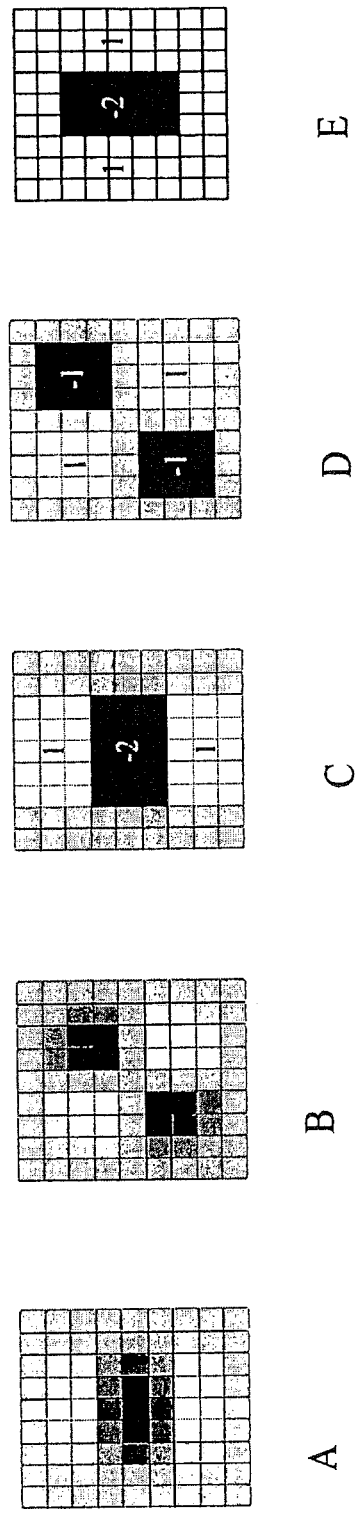
FIGS. 2A and B show discretised and cropped digital filters representing second order partial derivatives of a Gaussian in y-direction and xy-direction respectively in accordance with an embodiment of the present invention; grey values represent zero, darker values are negative, brighter ones positive.
FIGS. 2C and 2D and 2E show discretised and cropped digital filters representing approximations of second order partial derivatives of a Gaussian in y-direction and xy-direction and x-direction, respectively in accordance with an embodiment of the present invention. The grey regions have a filter value equal to zero.

The scale space is divided into octaves. An octave represents the interval between two successive, increasingly sub-sampled images, and normally spans a scale change of 2. Each octave is subdivided into a constant number of scale levels. Due to the discrete nature of integral images, the maximum number of sub-divisions of the octaves depends on the initial length $L_0$ of the positive or negative lobes of the partial second order derivative in one direction (x or y). For the 9×9 filter mask described with reference to FIG. 2, this length is 3. For two successive levels, this size (or spatial extent of the digital filter) can be increased by increasing the sizes of the sub-filters or discrete sub-regions of the digital band pass filter, e.g. the box filter size. For example, the side dimension of the subfilters, i.e. the box filters, is increased by a minimum number of R pixels, e.g. by 2 pixels (e.g. add one pixel on every side to the spatial extent of the box filter). Preferably the size or spatial extent of the filter is kept an uneven of pixels. A total increase of the side dimension of the complete digital filter of FIG. 2C to E is then 6 pixels for the first scale level (i.e. each box filter increases by 2 so the complete filter increases by 6 pixels). For the filters of FIGS. 2D and 2E there are only two sub-regions but these are also increased by 6, e.g. the size is increased in order to keep a constant ratio between height and width of the lobes.

The present invention includes different possibilities for how the scale analysis is done, e.g. depending on the filter mask size used for the analysis of the first scale level. Below two versions will be described as examples. The present invention is not limited to these two versions. The simplest one and the quickest to compute, starts with the 9×9 filters of FIG. 2, and calculates the blob response of the image (by looking for the approximate determinant of the Hessian as described above) in the first octave with a sampling factor of 2 in x and y. Then, filters with sizes of 15×15, 21×21, and 27×27 pixels, for example, are applied, by which time even more than a scale change of 2 has been achieved.

1. For the next octave, the sampling intervals for the extraction of the interest points can be doubled. The second octave works with filters that grow another number S in size, e.g. the combinations of box filters grow 12 pixels in side dimensions (2 pixels on either side of each sub-filter region or box) from scale to scale within the octave, a third octave's filters grow in side dimensions by another number T, e.g. 24 pixels, and a fourth octave's filters grow in side dimensions by another number U, e.g. 48 pixels, etc. The way R, S, T, U, etc. are related to each other can be varied according to the application. For example, the increase in size can be in an arithmetic or an algebraic or in a geometric progression. The large scale changes, especially between the first filters within these octaves (from 9 to 15 is a change by 1.7 in this example), renders the sampling of scales quite crude. Therefore, a scale space with a finer sampling of the scales has also been implemented as an alternative. This first doubles the size of the image, using linear interpolation, and then starts the first octave by filtering with a filter of size 15×15 and a sub-sampling with a factor of 4 in the horizontal and vertical direction. Additional filter sizes are 21×21, 27×27, 33×33, 39×39, and 45×45. Then a second octave starts, again using filters which now increase their side dimensions by 12 pixels, after which a third and fourth octave follow. Also more octaves may be analysed as long as the filter size remains smaller or equal to the minimum input image size (min(width, height)) minus 3 samples in order to apply at least one non-maximum suppression iteration. With the input image size is not meant the size of the captured image, necessarily. Before the interest point detection, the detected image can be scaled (bigger or smaller) and optionally smoothed or preprocessed in another way to yield the input image for the computation of the integral image. Now the scale change between the first two filters is only 1.4. In the following, the two versions of the scale space described above will be referred to as the 'fast' and 'accurate' ones. Both of these are embodiments of the present invention, but the invention is not limited to only these two. The captured image can be scaled to the double or higher image sizes, for example using interpolation. Then bigger initial filter sizes can be used in order to reduce the first scale change even further without losing details at small scales. e.g. triple the image size and using a 27×27 filter is equivalent to a 9×9 filter at original image size. The next possible filter size would be 33×33. This corresponds to an even finer first scale change of 1.22. Use of finer scaling is not essential for the present invention. Not for all applications are fine scale changes desirable. Therefore also smaller initial filter sizes of 3×3 at half image size can be used, e.g. using a scale change of 3 as the next possible filter size is 9×9.

Interest Point Localization

In order to extract interest points in the image and optionally over scale, a non-extremum (e.g. non-maximum or non-minimum or non-maximum and non-minimum) suppression in a certain neighbourhood in the image and scale space is applied—see FIG. 4B. Non-extremum suppression means that the value for the determinant of the Hessian, e.g. the approximate determinant of the Hessian matrix, is calculated for each image sample and is inspected to see if it represents an extreme value (e.g. maximum and/or minimum) in a (2N+1)×(2N'+1)×(2N"+1) volumetric neighbourhood having N pixels on each side. The values of N, N' and N" need not all be the same and N" (in the scale direction) can be zero. As the number of filtered images to provide this neighbourhood is N"+1, only this number of images has to be calculated in accordance with the present invention to obtain interest points.

Within the neighbourhood a pixel or sample is considered an interest point if and only if it's determinant value is an extreme value, e.g. bigger and/or smaller than all other pixel (or sample) determinant values in this neighbourhood. That means that all other pixels, which do not have such an extreme value, e.g. maximum determinant value, (i.e. the non-maximum pixels) are suppressed. If non-minimum suppression is used, then the samples are examined for the minimum of the determinant of the Hessian, e.g. the approximate determinant of the Hessian matrix, and the interest point is selected on the local minimum value. Not every pixel or sample needs to be considered, to save time some could be missed.

In accordance with this embodiment both scalar and spatial dimensions e are considered, and the non-extremum suppression (e.g. non-maximum suppression and/or non-minimum suppression) is applied in three dimensions (i.e. x, y, and scale dimensions). The pixels or samples with the locally extreme determinant value of the Hessian matrix or the approximate value thereof (i.e. the locally minimum or maximum value of the Hessian matrix or the approximate value thereof) are considered as interest points.

Accordingly, interest points are extracted in a volume of the image pyramid, for example, that is in a volumetric neighbourhood V×V×V such as a 3×3×3 neighbourhood. This means that in 3 layers of the image pyramid and an image area of 3 pixels by 3 pixels, i.e. a volume of 3×3×3 is examined in order to determine local extrema of the determinant of the Hessian, e.g. the approximate determinant of the Hessian as explained above. As the value of the Hessian determinant or the approximate Hessian determinant has only to be calculated at discrete scaling levels in the pyramid and at discrete pixels or samples of the image, a true extreme value of the Hessian determinant might lie between the actually calculated levels and/or between pixels or samples. Optionally, the extrema of the determinant of the Hessian matrix or the approximate Hessian determinant can be investigated by interpolating in scale and/or image space, e.g. with the method proposed by Brown et al. [27]. For example, such an interpolation may be by a polynomial or trigonometric interpolation as is known to the skilled person. Scale space interpolation can be important, as thereby the error of the first scale change in every octave can be reduced.

Sums of Components Descriptor

An aspect of the present invention is to provide a descriptor. This descriptor is a mix of using crude localisation information and the distribution of contrast related features that yields good distinctive power while fending off the effects of localisation errors in terms of scale or space. Using relative strengths and orientations of gradients reduces the effect of photometric changes. The first step consists of fixing a reproducible orientation around an interest point based on information from a region, e.g. circular region around the interest point. Then a square or quadratic region is aligned to the selected orientation, and the descriptor is extracted from this localised and aligned square or quadratic region. The interest point may be obtained by the methods described above or by any other suitable method. It is expected that this aspect of the present invention is not limited by how the interest point is obtained. However, the method of obtaining the interest point can have synergistic effects with the descriptor of the present invention. For example a detector method which provides the sign of the trace (Laplacian), as the method described above does, in a simple manner is particularly preferred.

Orientation Assignment

In order to be invariant to rotation, e.g. to work with a variety of different orientations, a reproducible orientation is identified for the interest points. Rotation invariance may or may not be desirable, depending on the application. The orientations are extracted in a region of the image pyramid. This region can be a 3 dimensional region of the image and scale space or it can be a 2 dimensional region either in an image plane or in the scaling direction. The region can be isotropic, i.e. a sphere in 3 dimensions or a circle in 2 dimensions. In accordance with an embodiment of the present invention this region is a circular area around the interest point of radius Z×s, e.g. 6s, where s is the current scale, sampled with a sampling step size of s pixels and lying in an image plane. The value of Z is not limited to 6s. For practical reasons, 6s is a convenient size. With this size it has been found that the orientation is robust to viewpoint changes and occlusions. Smaller sizes may be disadvantageous and capture only the blob or interest point and provide no meaningful results. Larger sizes such as 8s are also suitable. Increasing the size too much may result in loss of robustness to viewpoint changes and occlusions when matching between images.

Using a region to be investigated of 2 dimensions has certain advantages. A first one is time. It results in a quicker feature computation, and it is more suitable for smaller scales. It has been found by experimentation with different scales that small scales can capture too many details and large scales can be too forgiving. The present invention is not limited to a 2D region—different dimensions of the region to be investigated are included within the scope of the present invention and could be advantageous for some cases.

Next the horizontal and vertical scalar contrast measures are calculated with wavelet-like masks of side length 4s, e.g. Haar-wavelet responses are calculated in x and y direction in a circular neighbourhood of radius 6s around the interest point, with s the scale at which the interest point was detected. The parameters 4s and 6s have been carefully chosen based on experiment in order to provide the interest point with a robust orientation. The present invention is not limited to these values and different values are included within its scope.

Figure 5:
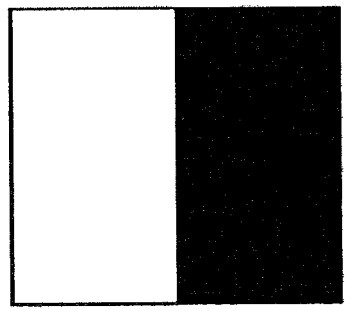
FIG. 5 shows contrast related Haar wavelet digital filters used in an embodiment of the present invention to find contrasts. The size of the used wavelet is twice as big as the sampling step.
Figure 5:
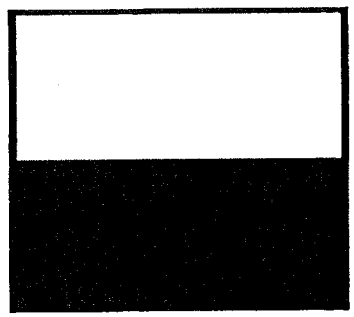

Also the sampling step is scale dependent. It can be chosen to be s. Accordingly, the wavelet responses in x and y direction are computed at that current scale s. At high scales the size of the wavelets is big. Again integral images can be used for fast filtering. Filters that can be used in accordance with an embodiment of the present invention are shown in FIGS. 5A and B. These show two filters which comprise a block of filter values of one sign (e.g. positive) abutted with a block of values of the opposite sign (e.g. negative). The purpose of these filters is to extract local contrast. Any other filter of this type can be used. The purpose of these filters is to detect large contrasts, e.g. edges in the image usually have high contrast. The side length of the wavelets is 4s but the present invention is not limited thereto. 4s has proved by experiment to be a very good choice for many situations and applications. If the images to be compared can be related by a homography, smaller values than 4s can be used. In other applications bigger values can be advantageous.

Figure 6:
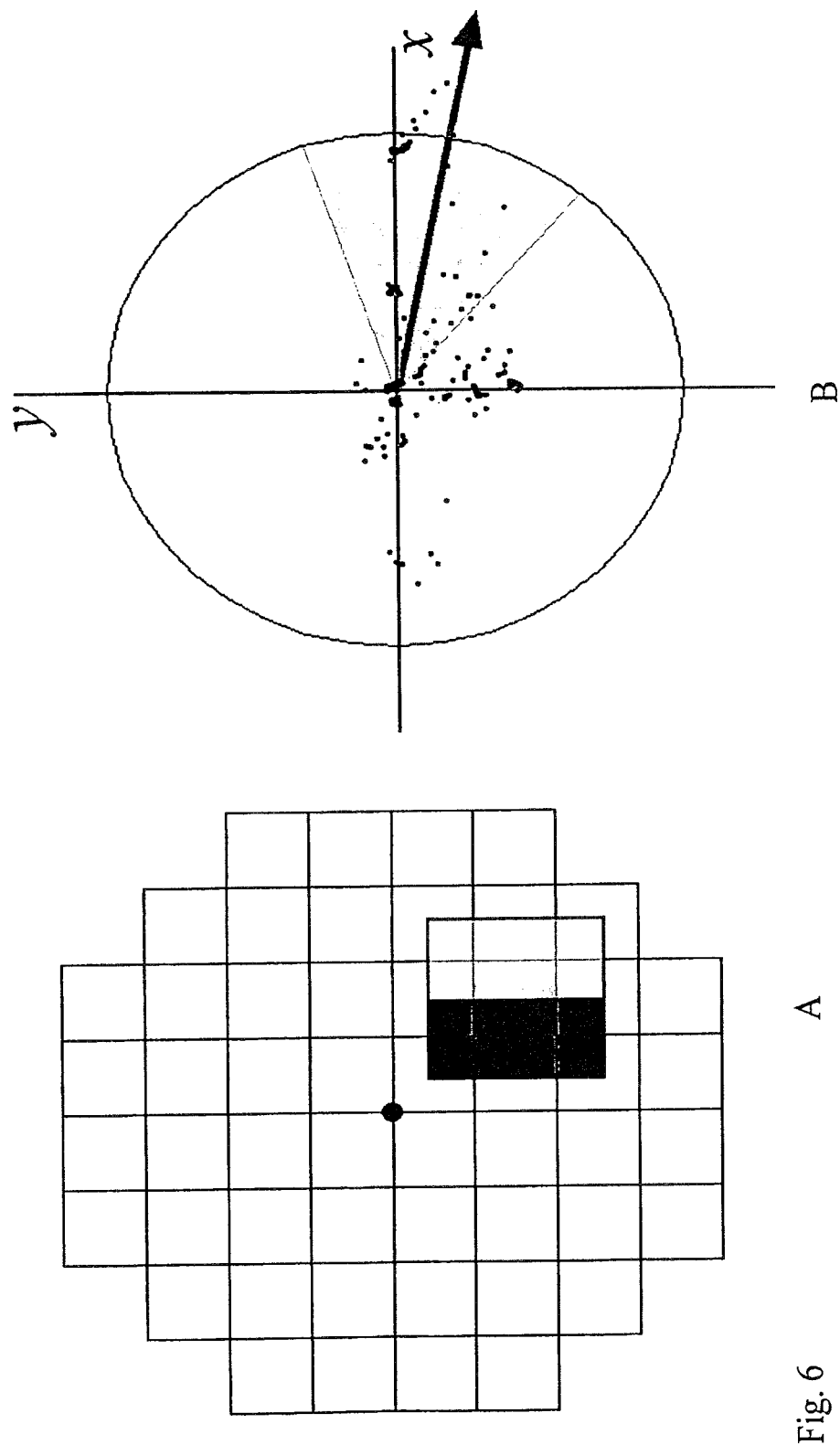
FIG. 6A shows the discrete circular area around an interest point of an image used to determine a reproducible orientation in an embodiment of the present invention. The figure shows wavelet responses in x- and y-direction that have been computed for every sample.
FIG. 6B shows how a representative vector for a window is obtained in an embodiment of the present invention. The wavelet responses in x- and y-direction are jointly represented as points, with these responses as their x- and y-coordinates, respectively. A vector is derived from all points within the window, by adding the wavelet responses in the x-direction and in the y-direction, after weighting these responses with a factor. This factor is determined by a suitable weighting function such as a Gaussian, centered at the interest point, and thus gets smaller the more the point where the wavelet responses are measured, are removed from the interest point. These sums of weighted responses in the x- and y-direction yield the x- and y-components of the vector, respectively. Several such windows are constructed, with different orientations. The orientation of the vector for the window yielding the vector with the largest magnitude is taken as the reproducible orientation of the interest point.

The resulting responses in the circle (FIG. 6A) are shown schematically in FIG. 6B.

Only six memory accesses are needed to compute the response in x or y direction at any scale. Memory accesses are important as they can often take more time than arithmetic operations, and minimizing the number of memory accesses is therefore important for speed optimization. Also memory access absorb power so that reducing memory accesses reduces power consumption and hence improves battery life for battery driven computing systems. For example, using the representation of the integral image in FIG. 1, suppose two of such areas are located side by side. The one (Oa) with negative weight and the corners A,B,C,D, Oa=−A+B+C−D and the second one (Ob) with positive weight and the corners E,F,G,H, Ob=E−F−G+H. Ob is on the right hand side of Oa. Therefore, G=A and H=B. The wavelet response is Oa+Ob=−A+B+C−D+E−F−G+H=−A+B+C−D+E−F−A+B=−2A+2B+C−D+E−F.

Then, the wavelet responses are optionally weighted in some way, e.g. with a Gaussian (e.g. σ=2.5s) centred at the interest point. This means that responses close to the centre of the interest point are weighted to have a larger effect than responses farther away. In this way the responses close to the interest point are more significant than remote responses (which could be related to another interest point). In the particular example given above, the weighting is done by multiplying the responses with a 2D Gaussian function centred on the interest point. Other weightings can be used, e.g. linear or non-linear weighting with respect to distance from the interest point. These weighting algorithms preferably provide higher invariance of the descriptor towards image deformations, e.g. because responses further out count less.

The sum of the weighted wavelet responses within a plurality of averaging windows around the interest point is used to derive a dominant orientation of the interest point. This orientation is used to build the descriptor. In accordance with an embodiment of the present invention, the dominant orientation is estimated by calculating the sum of all responses within a sliding orientation window, e.g. a sector of the circle of size π/w, where w is a number any where greater than or equal to 0.5. If the region being investigated is a volume then the window is a volumetric tile of that volume. Preferably it is a sliding volumetric tile of that volume, i.e. each window area or volume is adjacent to another one. The complete numbers of windows fills the region under investigation. Preferably each window has an apex located at the interest point, e.g. the window is a sector of a circle centered at the interest point.

The upper limit in the number of windows used within the region investigated is only determined by the practicalities of how many calculations need to be made. The value of w can be an integer, e.g. the sector is π/3 (see FIG. 6B). In a preferred method, the horizontal wavelet responses within each window are summed, and also the vertical responses, independently. The two summed responses then yield the vector coordinates of a local orientation vector. The length of the vectors from the different windows are then compared or ranked and the longest such vector lends its orientation to the interest point. For example, once the wavelet responses are calculated and weighted in some way, e.g. with a Gaussian (σ=2.5s), centred at the interest point, the responses from the individual pixels or samples within the windows are represented as points in a space with the horizontal response strength along the abscissa and the vertical response strength along the ordinate. The horizontal responses within the window are summed, and also the vertical responses. The two, summed responses then yield the x and y values of a new vector for that window as shown schematically in FIG. 6B. The procedure is repeated for other windows throughout the complete area around the interest point and the window vectors are compared with each other to determine the longest such vector among all the window vectors. The orientation of this longest vector is selected as the orientation of the interest point. Note that the interest-point location is a floating point number, but the integral image is preferably not interpolated. The integral image can be used for the fast extraction of the finite difference approximation.

Descriptor Generation

Figure 7:
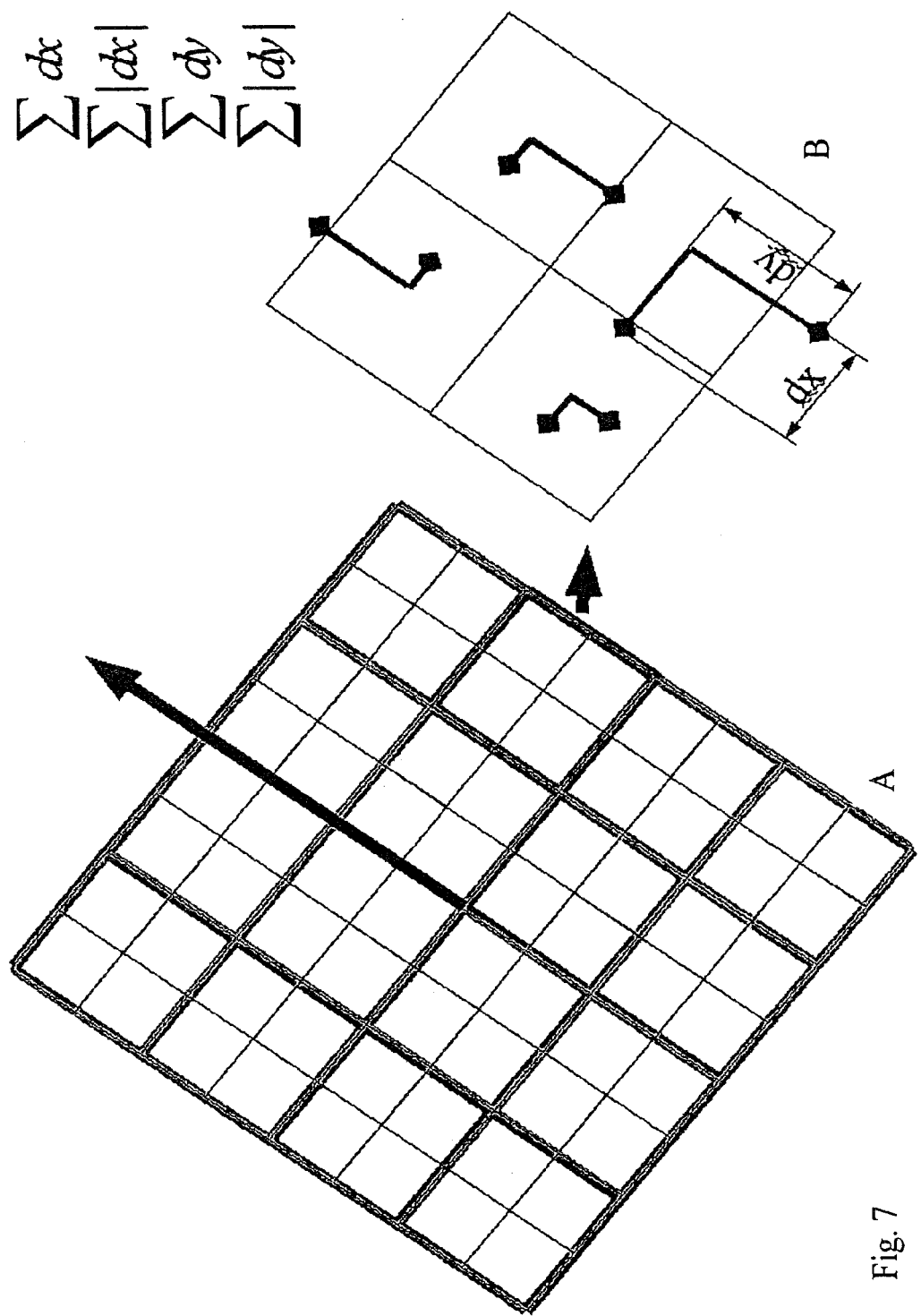
FIG. 7 shows how a square region is aligned with the assigned orientation in an embodiment of the present invention, and how the wavelet responses are computed according to this orientation. Moreover, the responses and their absolute values are separately summed up, resulting in a four-dimensional vector for every sub-division.

After having found the dominant orientation for an interest point, the extraction of the descriptor includes a first step consisting of constructing a region centred on the interest point, and oriented along the orientation selected, e.g. by the orientation assignment procedure above, or along the vertical orientation, in case rotation invariance is not desirable. The region can be a square region—see FIG. 7. This means a side of the square is arranged parallel to the assigned orientation.

The size of this window can be larger than that for the extraction of its global orientation, e.g. it can be selected at 20s or another value. The new region is split up regularly into smaller regions, e.g. 4×4, i.e. 16 square sub-regions. This retains important spatial information. For each sub-region, a few descriptor features are calculated at a number, e.g. 5×5 regularly spaced sample points resulting in 4×4×25 or 16×25 points. The first two of such descriptor features are defined by the mean values of the responses $d_x$ and $d_y$. The Haar wavelet response in one direction x is called $d_x$ (which may be represented by the change of contrast or image intensity along the x direction, i.e. dI/dx) and the Haar wavelet response in another direction y which can be an orthogonal direction y, is called $d_y$ (which may be represented by the change of contrast or image intensity along the y direction, i.e. dI/dy) where the x and y axes can be oriented parallel to the region's borders—see FIG. 7 or in any other fixed relation thereto. These features are extracted similarly to the ones for the orientation assignment, e.g. the mask size is 2s. In order to bring in information about the polarity of the intensity changes, the mean values of the absolute values of $d_x$ and $d_y$, i.e. of $|d_x|$ and $|d_y|$ are also included. In order to increase the robustness towards geometric deformations and localization errors, $d_x$ and $d_y$ can be weighted by a suitable method. For example, they can be Gaussian weighted with a suitable value of σ such as 3.3s and centred at the interest point. Other weighting schemes can be used in which responses close to the interest point are more weighted than responses farther away. Weighting means multiplying the responses with values from a weighting algorithm, e.g. the Gaussian values, being dependent upon distance from the relevant interest point, before adding them to the sum.

Summarising the above the descriptor can be defined by a multidimensional vector v, where:

$$v = (\Sigma d_x, \Sigma d_y, \Sigma |d_x|, \Sigma |d_y|) \quad (5)$$

or the equivalent average values for the vector coordinates, i.e. each sum of this vector is divided by the number of responses used to calculate it. The vector co-ordinates can be placed in any suitable order.

An alternative, extended version of the descriptor adds further features. It again uses the same sums as before, but now splits these values up further. The sums of $d_x$ and $|d_x|$ are computed separately for $d_y<0$ or $d_y\geq0$. Similarly, the sums of $d_y$ and $|d_y|$ are split up according to the sign of $d_x$, thereby doubling the number of features.

This descriptor than may be described as:

$$v = (\Sigma_{dy<0} d_x, \Sigma_{dx<0} d_y, \Sigma_{dy<0} |d_x|, \Sigma_{dx<0} |d_y|, \Sigma_{dy\geq0} d_x, \Sigma_{dx\geq0} d_y, \Sigma_{dy\geq0} |d_x|, \Sigma_{dx\geq0} |d_y|) \quad (6)$$

or the equivalent average values for the vector coordinates, i.e. each sum of this vector is divided by the number of responses used to calculate it. The vector co-ordinates can be placed in any suitable order.

The number of descriptor dimensions depends on the number of sub-regions to be considered and whether parts or sub-regions of the descriptor (e.g. the sums of dx and |dx|) are split according to their sign resulting in a multi-dimensional vector for every sub-region. More precisely, the sums of dx and |dx| are calculated separately for dy≤0 and dy>0. Also the sums of dy and |dy| are calculated separately for dx≤0 and dx>0. As an example, this descriptor yields a 128-dimensional descriptor for a region of regular 4×4 sub-regions.

Usable results can be achieved with other region sizes, e.g. 2×2 sub-regions can be used that result in a 16-dimensional descriptor or a 32-dimensional descriptor depending on whether the extended descriptor is used.

Figure 8:
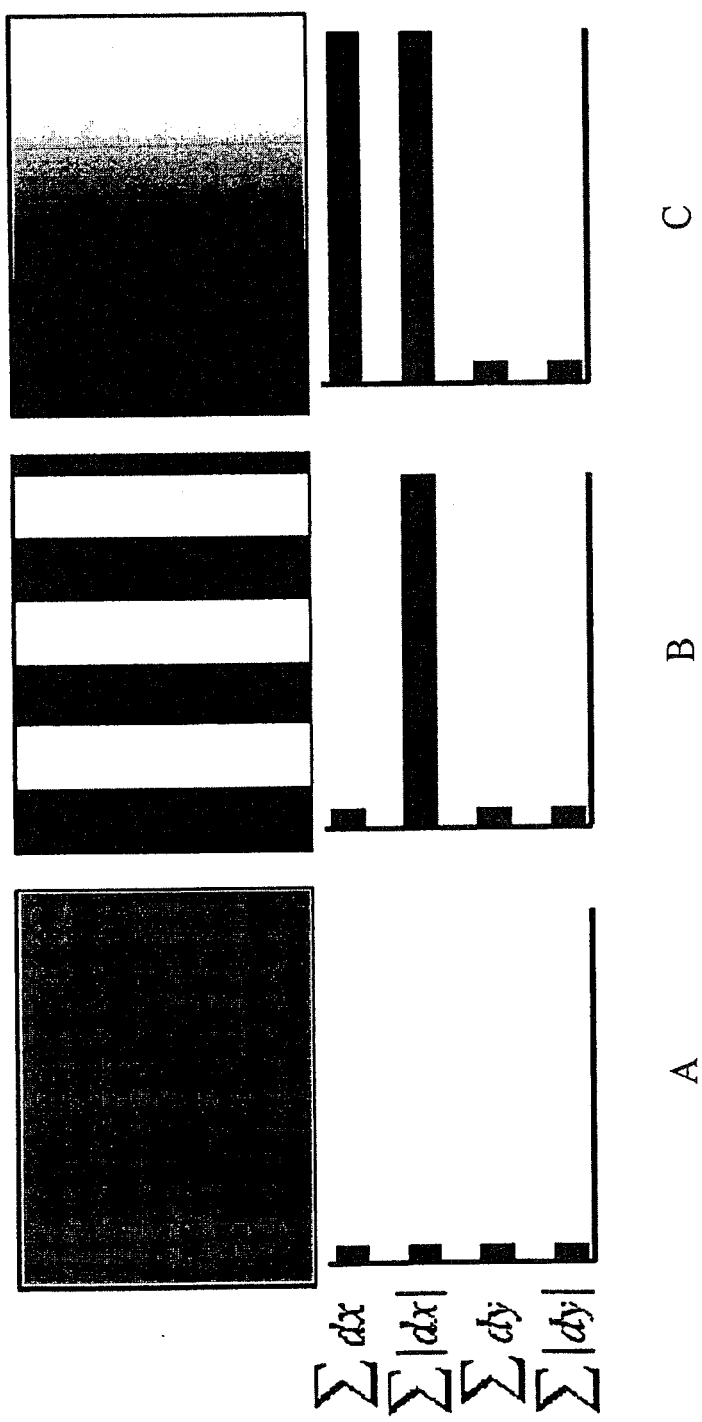
FIG. 8 shows a nature of a descriptor according to embodiments of the present invention for different intensity patterns in the image. For homogeneous regions, all entries of the descriptor remain relatively low (FIG. 8A). For high frequencies (FIG. 8B), the sums of the absolute values of the wavelet responses are high in the direction of the frequencies, but the regular sums remain low. For gradually changing intensity, both the sum of the absolute value of the wavelet responses and the regular sum are relatively high for the direction of the gradual change (FIG. 8C). This results in a distinctive description of the interest point's neighbouring intensity pattern, which is often a combination of the above mentioned.

FIG. 8 shows a nature of the descriptors described above for different intensity patterns in the image. For homogeneous regions, all entries of the descriptor remain relatively low (FIG. 8A). For high frequencies (FIG. 8B), the sums of the absolute values of the wavelet responses are high, but the regular sums remain low. For gradually changing intensity, both the sum of the absolute value of the wavelet responses and the regular sum are relatively high (FIG. 8C). This results in a distinctive description of the interest point's neighbouring intensity pattern, which is often a combination of the above mentioned.

The descriptor (see vector (6)) is more distinctive and not much slower to compute, but slower to match compared to the one given in vector (5). These two versions will be described as the 'normal' (vector (5)) and the 'extended' (vector (6)) descriptor.

For faster indexing during the matching stage, it is preferred to introduce an element to the descriptor that distinguishes the type of contrast of the interest point. For example, the sign of the Laplacian (i.e. the trace of the Hessian) for the underlying interest point can be included in the descriptor. Vectors 5 and 6 then become, respectively:

$$v = (\Sigma d_x, \Sigma d_y, \Sigma |d_x|, \Sigma |d_y|, L) \quad (7)$$

$$v = (\Sigma_{dy<0} d_x, \Sigma_{dx<0} d_y, \Sigma_{dy<0}|d_x|, \Sigma_{dx<0}|d_y|, \Sigma_{dy\geq 0} d_x, \Sigma_{dx\geq 0} d_y, \Sigma_{dy\geq 0}|d_x|, \Sigma_{dx\geq 0}|d_y|, L) \quad (8)$$

or the equivalent average values for the vector coordinates, i.e. each sum of this vector is divided by the number of responses used to calculate it, where L is the sign of the Laplacian. The vector co-ordinates can be placed in any suitable order.

Figure 9:
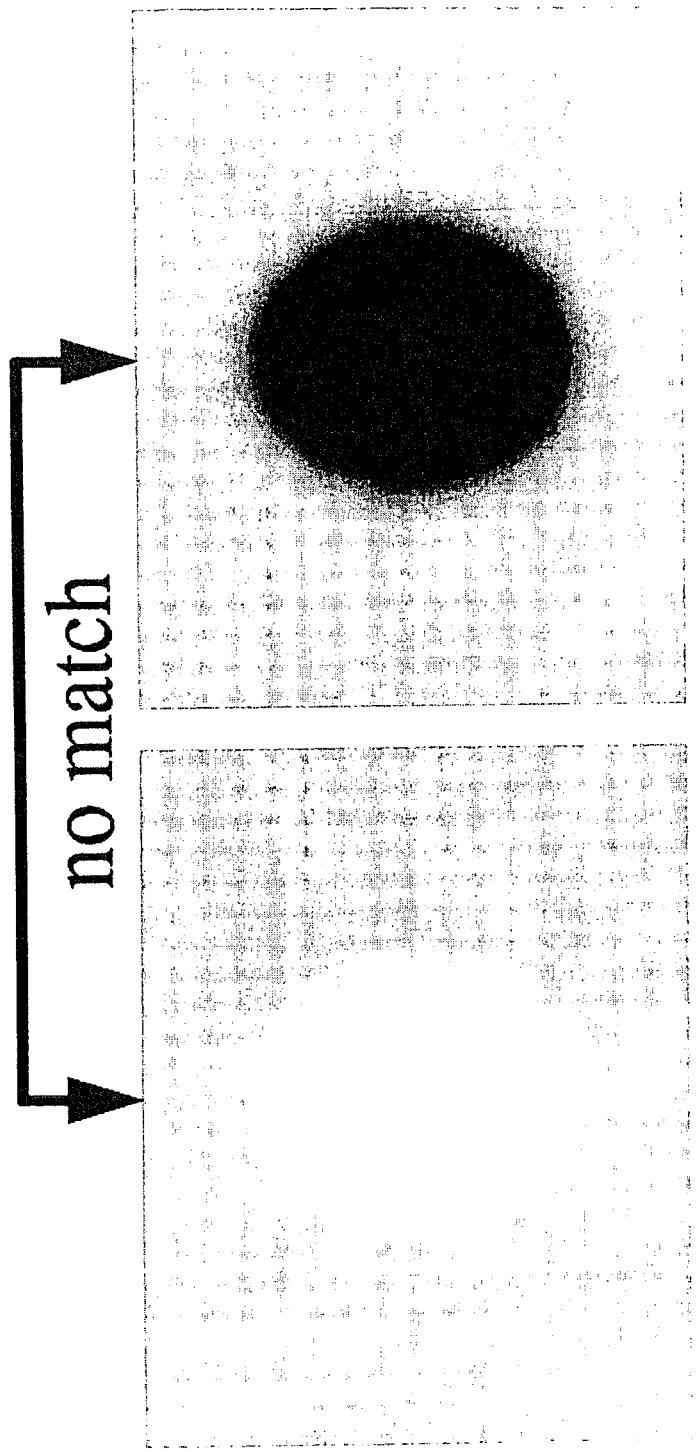
FIG. 9 shows that the sign of the Laplacian can be used optionally to distinguish dark blobs on a light background from the inverse situation in accordance with an embodiment of the present invention. Only interest points with the same kind of contrast are candidates for the matching step. This accelerates the matching time.

The Laplacian is the trace (diagonal sum) of the Hessian matrix, and the Hessian matrix has already been explained above for the interest point detection. This feature is available at no extra computational cost, as it was already computed during the detection phase. In case of combining a descriptor in accordance with the present invention with another interest point detector (e.g. a Harris interest point detector), the Laplacian may not have been pre-computed and, as a consequence, would have to be computed separately. Typically, the interest points are found at blob type structures. Use of the Laplacian distinguishes bright blobs on dark backgrounds from the reverse situation—see FIG. 9. Hence, using the sign of the Laplacian in the third step, the matching stage, only features are compared if they have the same type of contrast, e.g. black or white. The fast version has 4 (or 5 if the Laplacian is included) features per sub-region and the extended one has 8 (or 9 if the Laplacian is included). Hence, the descriptor length is 65 for the fast version and 129 for the accurate version, where the sign of the Laplacian is in both cases included. The gradient components are invariant to a bias in illumination (offset). Invariance to contrast (a scale factor) is achieved by normalisation of the descriptor vector before adding the information about the Laplacian.

In order to arrive at these descriptors, several parameters had to be fixed. Extensive tests have been run on these, in order to optimise the choices. For instance, different numbers of sample points and sub-regions were tried. The 4×4 sub-region division solution provided the best results although the present invention is not limited thereto. Considering finer subdivisions appeared to be less robust and would increase matching times too much. On the other hand, the short descriptor with 3×3 sub-regions performs less well, but allows for faster operation and is still quite acceptable in comparison to other known descriptors.

EXPERIMENTAL RESULTS

Figure 10:
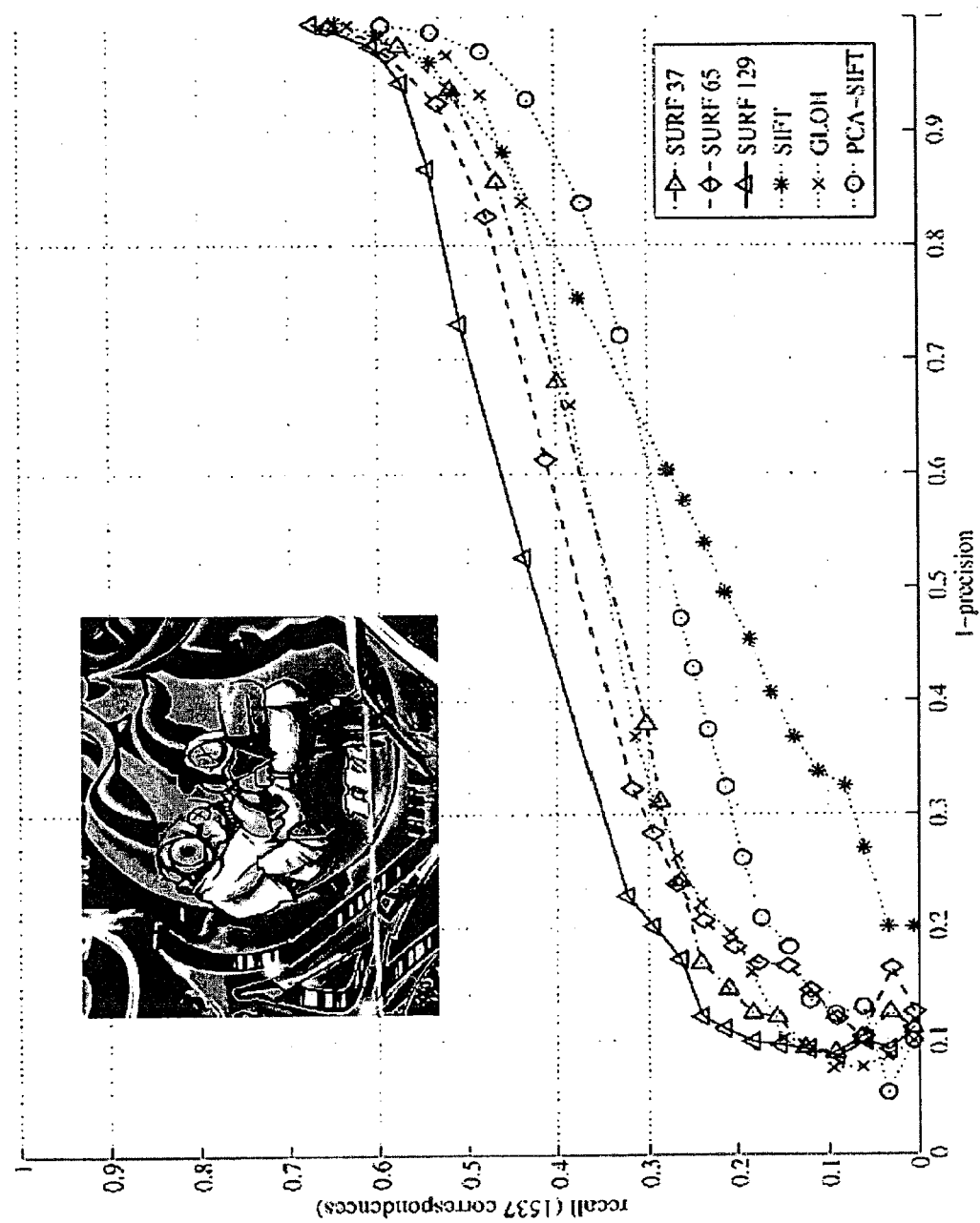
FIG. 10 shows a comparison of experimental results between a method according to the present invention and known methods. "SURF" refers to application of the present invention. SURF 37 refers to the number of dimensions of the descriptor used, i.e. 37, and similarly for SURF 65 and 129.

In FIG. 10, the above parameter choices are compared for the standard 'Graffiti' scene, which is the most challenging of all the scenes in that benchmarking set, as it contains out-of-plane rotation, in-plane rotation as well as brightness changes. The view change was 30 degrees. The interest points were computed in accordance with the present invention with the Hessian approximation (SURF) on the double image size with an initial mask size of 15×15. SURF37 and SURF65 correspond to short descriptors with 3×3 and 4×4 subregions, resp. SURF129 corresponds to an extended descriptor with 4×4 subregions. The extended descriptor for 4×4 sub-regions performs best. Also the short descriptor for the same number of sub-regions performs well, and is faster to handle.

Implementation

Figure 11:
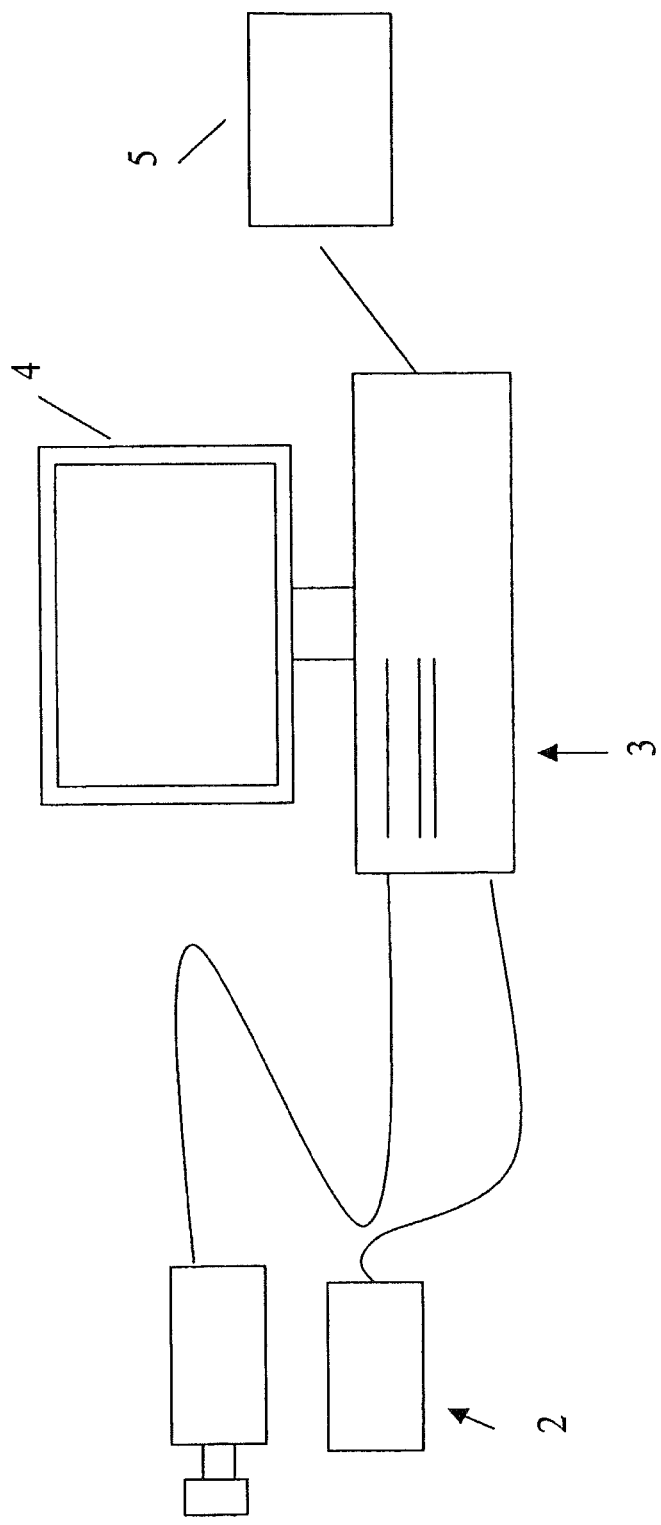
FIG. 11 shows a generic computing system which may be used with the present invention comprising a digital camera for capturing an input image. The image is transferred to a computation unit where the interest points are detected and can be matched using a descriptor.

An example of a computing environment for use with the present invention is shown in FIG. 11 schematically. It comprises a camera 2 such as a digital camera or other device for capturing or transmitting at least one or at least two images of the same scene or different scenes. The device 2 may also be or include a storage means from which at least one or at least two images may be retrieved or it may include or be a connection to a network such as a Local Area Network or a Wide Area network via which at least one or at least two images may be downloaded. However the image or images are obtained they are transferred to a computer or computing system 3. The computer or computing system 3 can be any suitable system such as a personal computer, a laptop or palmtop computing device, a PDA, a work station such as a UNIX workstation, or a parallel processing computing system, a card in a computing system such as a graphics accelerator card, an embedded system, e.g. in a robot, etc. However, the computing system 3 is implemented, such a system will include a processor or processing engine and this device is used to carry out any of the methods of the present invention, e.g. for detection of the interest points and/or generation of the descriptor, etc. Finally, the result is displayed on any suitable display device 4, e.g. a screen of a visual display device, a plotter, a printer, or the result may be sent via a network to a remote site for further processing and/or display. A display device 4 is not a requirement of the present invention. Alternatively, or additionally a connection to an actuator system 5 may be provided. This actuator system 5 may be adapted to perform an action based on a signal from the computing system. An example, would be that when two images have been compared and an interest point has been found common to both images and then in response to this determination either no operation is carried out or an operation is carried. An example of no operation is when the above system is used for quality control of products on a transport system such as a conveyor belt, and the identification of the same interest point or points indicates that the product is good. In this case the product is allowed to pass on its way and no action is taken. An example of an operation is when in the same system used for quality control of products on a transport system, no common interest point or not all necessary common points are identified which would be an indication that the product is bad. The operation then may be activation of a device, e.g. a pneumatic ram or jet, to remove the product from the transport system. Another example of an operation would be to move the guidance system of a moveable robot to avoid an object identified by the common interest points between a captured image, e.g. from a camera and a stored image. Another operation could be sounding an alarm, e.g. when the facial features of a captured image of a person have a matching descriptor with the stored images of undesirable persons.

The actuation system 5 can be internal to the computer system. For example, the computing system 3 is used to analyse a large database of images to identify an image or a part of an image therein. In this case a descriptor(s) in accordance with the present invention is (are) generated based on certain interest points of a new image and is (are) used to interrogate the database to find a match. If no match is found the new image may be stored in a suitable non-volatile memory device such as a hard disk, a tape memory, an optical disk, a solid state memory, etc. as it is not present in the database. Alternatively, if a match is found another operation may be performed, e.g. display of the new image, discarding the new image, raising an alarm, etc.

Returning to FIG. 11, preferably, the camera 2 is operable to move to a plurality of positions about an object to capture images of the object from various positions, and optionally in a plurality of different lighting conditions. Alternatively, several cameras 2 in different positions are provided. The camera 2, or alternatively, a plurality of cameras 2, is adapted to provide to the computer 4 one or more images, e.g. taken from different positions, in different lighting conditions.

The computer or computer system 3 is programmed to produce a plurality of filtered images from each image as described above and optionally to store such filtered images in memory or on a storage device. The computer is also programmed to locate interest points by examining for extrema in at least approximate values of the determinant of the Hessian matrix as described above. Additionally or alternatively, the computer 4 is programmed to generate a descriptor by the methods described above. In particular the computer is adapted to identify a region around one or more extrema, and to divide this region into tiles. For each tile a contrast related value is determined in at least two orthogonal directions by application of one or more digital filters such as Haar wavelet filters. The responses to at least one digital filter are summed in the at least two orthogonal directions. The summing can include both summing the responses and summing the absolute value of the responses. The computer 2 may also be adapted to assign an orientation for an interest point. To this end the computer 2 may identify a region around an interest point and divide this region into contiguous tiles. These tile may all have a common apex at the interest point. For each tile the computer 2 may be adapted to calculate contrast related values determined in at least two orthogonal directions by application of one or more digital filters such as Haar wavelet filters. The responses to at least one digital filter are summed in the at least two orthogonal directions to give two vector co-ordinates. The computer 2 is adapted to select from the tiles the vector with the maximum magnitude and to assign the direction of this vector to the interest point as its orientation.

Figure 12:
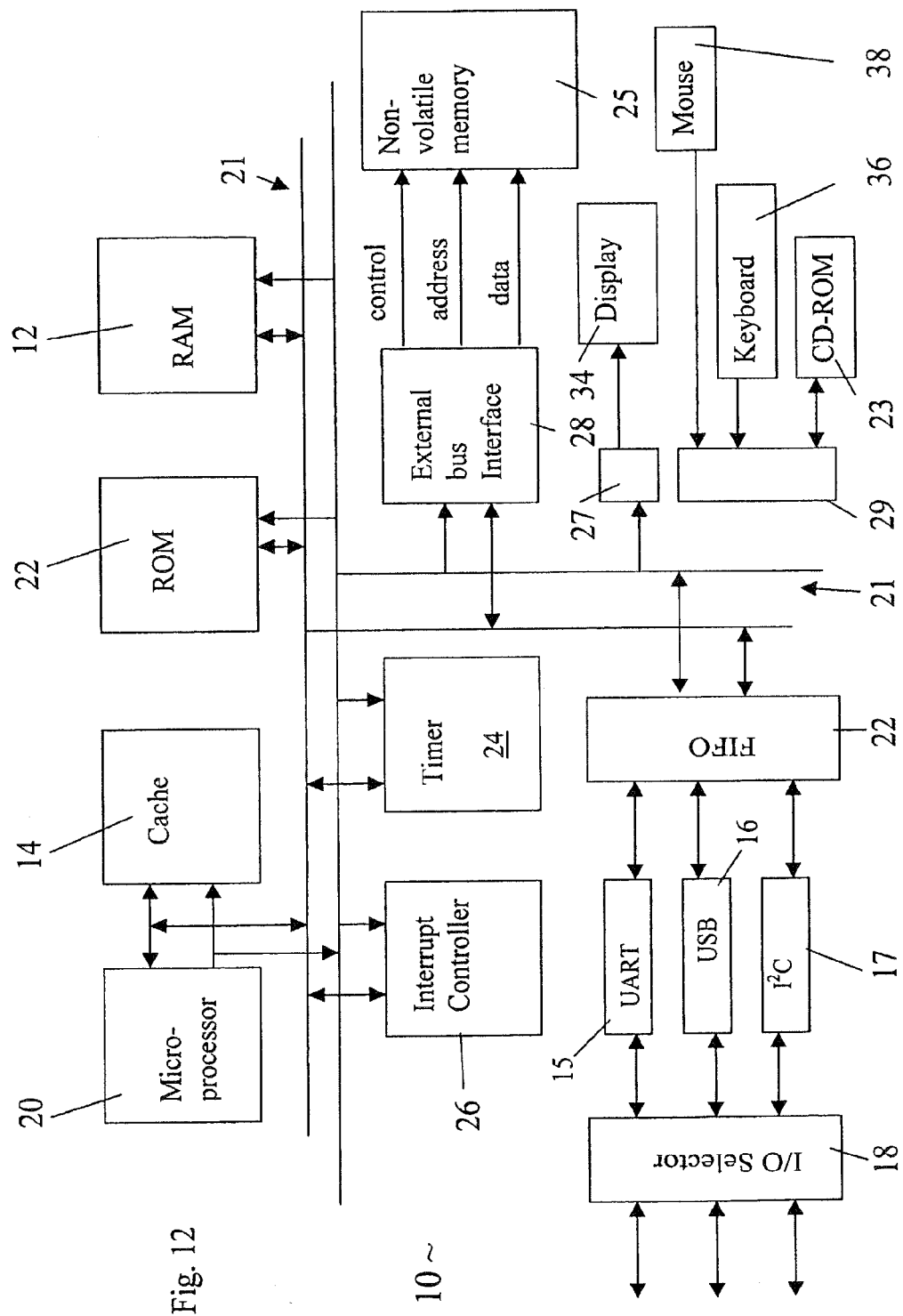
FIG. 12 shows a particular computing system as an example of a system that may be used with the present invention.

An example of one possible stand alone computing system is shown schematically in FIG. 12. The elements shown in FIG. 12 may be functional blocks that are not necessarily to be found in discrete hardware components but rather distributed as required. A computing device 10 may be a computer such as a personal computer or workstation. The computing device 10 includes a central processing unit ("CPU") or microprocessor 20 such as a Pentium processor supplied by Intel Corp. USA or similar. A RAM memory 12 is provided as well as an optional cache memory 14 or co-processor. Various I/O (input/output) interfaces 15, 16, 17 may be provided, e.g. UART, USB, I²C bus interface, FireWire etc. as well as an I/O selector 18 for receiving data from a suitable source, e.g. from a camera, from a modem, for connecting to network, etc. or for sending data or signals to a remote device such as the actuation system of FIG. 11. FIFO buffers 22 may be used to decouple the processor 20 from data transfer through these interfaces. A counter/timer block 24 may be provided as well as an interrupt controller 26. The various blocks of computing device 10 are linked by suitable busses 21.

Various interface adapters 27-29 can be provided. Adapter 27 is an interface adapter, e.g. a display adapter, for connecting system bus 21 to an optional video display terminal 34. Further adapters 29 provide an input/output (I/O) adapter for connecting peripheral devices (e.g. an optical drive such as a DVD or CD-ROM drive 23, a PCMCIA solid state memory device or a USB solid state memory device, etc.) to system bus 21. Video display terminal 34 can be the visual output of computer device 10, which can be any suitable display device such as a CRT-based video display well-known in the art of computer hardware. However, with a portable or notebook-based computer, video display terminal 34 can be replaced with a LCD-based or a gas plasma-based flat-panel display. Computer device 10 further includes connecting a keyboard 36, mouse 38, and optional speaker, etc. using adapter 29. Access to an external non-volatile memory 25 such a hard disk may be provided as an external bus interface 28 with address, data and control busses.

Optionally, software programs may be stored in an internal ROM (read only memory) 22 and/or may be stored in the external memory 25. An operating system may be implemented as software to run on processor 20, e.g. an operating system supplied by Microsoft Corp. USA, or the Linux operating system. A graphics program suitable far use by the present invention may be obtained by programming any of the methods of the present invention for the processor 20 and then compiling the software for the specific processor using an appropriate compiler. The methods and procedures of the present invention may be written as computer programs in a suitable computer language such as C++ and then compiled for the specific processor 20 in the device 10.

Another example of such a circuit 10 will be described with reference to the same FIG. 12 constructed, for example, as a VLSI chip around an embedded microprocessor 20 such as an ARM7TDMI core designed by ARM Ltd., UK which may be synthesized onto a single chip with the other components shown. A zero wait state SRAM memory 12 may be provided on-chip as well as a cache memory 14. Various I/O (input/output) interfaces 15, 16, 17 may be provided, e.g. UART, USB, I²C bus interface, FireWire etc. as well as an I/O selector 18 as described above for the stand alone computer system and used for a similar purpose. FIFO buffers 22 may be used to decouple the processor 20 from data transfer through these interfaces. A counter/timer block 24 may be provided as well as an interrupt controller 26. Software programs may be stored in an internal ROM (read only memory) 22 or in a non-volatile memory such as 25. Access to an external memory 25 may be provided an external bus interface 28 with address, data and control busses. The various blocks of circuit 10 are linked by suitable busses 21 through which the embedded system may be connected to a host computing system such as personal computer or a workstation.

Wherever above reference has been made to a processor this can be realized by using programmable hardware such as an FPGA or may be provided in a hardware implementation.

The methods and procedures of the present invention described above may be written as computer programs in a suitable computer language such as C and then compiled for the specific processor in the embedded design. For example, for the embedded ARM core VLSI described above the software may be written in C and then compiled using the ARM C compiler and the ARM assembler. Hence, the present invention also includes a computer program product which when implemented on a computer system like any of the ones described above implements any of the methods or systems of the present invention. The computer program product may be stored on any suitable storage medium such as optical disks, e.g. CD-ROM or DVD-ROM, magnetic tapes, magnetic disks such as hard disks, diskettes or the like, solid state memories such as USB memory sticks or the like.

REFERENCES

1. Lindeberg, T.: Feature detection with automatic scale selection. IJCV 30(2)(1998) 79-11613
2. Lowe, D.: Distinctive image features from scale-invariant keypoints, cascade filtering approach. IJCV 60 (2004) 91-110
3. Mikolajczyk, K., Schmid, C.: An affine invariant interest point detector. In: ECCV. (2002) 128-142
4. Se, S., Ng, H., Jasiobedzki, P., Moyung, T.: Vision based modeling and localization for planetary exploration rovers. Proceedings of International Astronautical Congress (2004)
5. Tuytelaars, T., Van Gool, L.: Wide baseline stereo based on local, affinely invariant regions. In: BMVC. (2000) 412-422
6. Matas, J., Chum, O., M., U., Pajdla, T.: Robust wide baseline stereo from maximally stable extremal regions. In: BMVC. (2002) 384-393
7. Mikolajczyk, K., Schmid, C.: A performance evaluation of local descriptors. In: CVPR. Volume 2. (2003) 257-263
8. Mikolajczyk, K., Schmid, C.: A performance evaluation of local descriptors. PAMI, 27(10). (2005) 1615-1630
9. Mikolajczyk, K., Tuytelaars, T., Schmid, C., Zisserman, A., Matas, J., Schaffalitzky, F., Kadir, T., Van Gool, L.: A comparison of affine region detectors. IJCV, 65(1/2). (2005) 43-72
10. Harris, C., Stephens, M.: A combined corner and edge detector. In: Proceedings of the Alvey Vision Conference. (1988) 147-151
11. Mikolajczyk, K., Schmid, C.: Indexing based on scale invariant interest points. In: ICCV. Volume 1. (2001) 525-531
12. Lowe, D.: Object recognition from local scale-invariant features. In: ICCV. (1999)
13. Kadir, T., Brady, M.: Scale, saliency and image description. IJCV 45(2) (2001)83-105
14. Julie, F., Schmid, C.: Scale-invariant shape features for recognition of object categories. In: CVPR. Volume II. (2004) 90-96
15. Mikolajczyk, K., Schmid, C.: Scale and affine invariant interest point detectors. IJCV 60 (2004) 63-86
16. Florack, L. M. J., Haar Romeny, B. M. t., Koenderink, J. J., Viergever, M. A.: General intensity transformations and differential invariants, JMIV 4 (1994) 171-187
17. Moons, T., Van Goal, L., Pauwels, E., Oosterlinck, A.: Viewpoint invariant characteristics of articulated objects. Journal of Mathematical Imaging and Vision (6) 37-58
18. Baumberg, A.: Reliable feature matching across widely separated views. In: CVPR. (2000) 774-781
19. Schaffalitzky, F., Zisserman, A.: Multi-view matching for unordered image sets, or "How do I organize my holiday snaps?". In: ECCV. Volume 1. (2002) 414-431
20. Freeman, W. T., Adelson, E. H.: The design and use of steerable filters. PAMI 13(1991) 891-906
21. Carneiro, G., Jepson, A.: Multi-scale phase-based local features. In: CVPR (1). (2003) 736-743
22. Ke, Y., Sukthankar, R.: Pea-sift: A more distinctive representation for local image descriptors. In: CVPR (2). (2004) 506-513
23. Viola, P., Jones, M.: Rapid object detection using a boosted cascade of simple features. In: CVPR (1). (2001) 511-518
24. Koenderink, J.: The structure of images. Biological Cybernetics 50 (1984) 363-370
25. Lindeberg, T.: Scale-space for discrete signals. PAMI (1990) 234-254
26. Lindeberg, T.: Discrete Scale-Space Theory and the Scale-Space Primal Sketch, PhD, KTH Stockholm, (1991)
27. Brown, M., Lowe, D.: Invariant features from interest point groups. In: BMVC (2002).

The invention claimed is:

1. A method for determining an interest point in an image having a plurality of pixels suitable for working at different scales and/or rotations, the method comprising: filtering the image using at least three digital filters, and selecting an interest point based on determining a measure resulting from application of the at least three digital filters, the measure being a non-linear combination of the outputs of the at least three digital filters, the measure capturing variations of an image parameter in more than one dimension or direction, the at least three digital filters being a combination of box filters, a first digital filter having a central lobe of one binary polarity, two zero crossing and two outer lobes of the opposite binary polarity and having a spatial extent greater than one pixel and a second digital filter wherein the central pixel has a zero value and there are two positive lobes along a diagonal and there are two negative lobes along the other diagonal, and a third digital filter that is a rotated version of the first filter.

2. The method of claim 1 wherein application of at least one digital filter to the image is performed with integral images.

3. The method of claim 1, wherein the combination of box filters approximates derivatives of a smoothing filter in more than one direction.

4. The method of claim 1, further comprising providing a plurality of filtered images at different scales using at least one the digital filters.

5. The method of claim 1 wherein the measure is the determinant of a Hessian matrix constructed from the results of applying at least one of the filters.

6. The method of claim 1, wherein at least one of the digital filters is derived from the second order derivative of a smoothing filter.

7. The method, according to claim 1, wherein at least one of the digital filters is applied at different scalings to the image to generate a plurality of filtered images.

8. The method of claim 1 wherein an interest point is determined as a local extreme value of the measure within a neighbourhood including a region of a filtered image.

9. The method of claim 8, wherein the neighbourhood is a space defined by at least three of a plurality of filtered images logically arranged in an image pyramid.

10. The method of claim 1 further comprising deriving a descriptor of an interest point in an image having a plurality of pixels, the interest point having a location in the image and an orientation, the method comprising: identifying a region in a neighbourhood around the interest point aligned with the orientation of the interest point, the neighbourhood comprising a set of pixels; examining tiles of the region, and for each tile generating a contrast related response using at least one digital filter, summing response values from application of the at least one digital filter in at least two orthogonal directions to generate summed values, and generating a multidimensional descriptor having first elements, each first element being based on the summed values.

11. The method of claim 10 wherein the descriptor the sign of the Laplacian at the interest point.

12. The method of claim 1 further comprising deriving a descriptor of an interest point in an image having a plurality of pixels, the interest point having a location in the image and an orientation, and a neighbourhood having been defined around the interest point aligned with the orientation of the interest point, the neighbourhood comprising a set of pixels; the method comprising:
   inspecting contrasts in the neighbourhood of the interest point using at least one digital filter,
   generating a multidimensional descriptor based on the results of the application of the at least one digital filter and absolute values of these results.

13. The method of claim 1 further comprising assigning the orientation of an interest point in an image having a plurality of pixels, the interest point having a location, the method comprising:
   identifying a region enclosing the interest point,
   determining an orientation for the interest point by:
   examining a plurality of tiles of the region, each tile comprising a plurality of pixels, determining for each tile filtered values related to contrast in two directions to thereby determine for that tile an orientation and a magnitude for that orientation, and assigning an orientation to the interest point by selecting the determined orientation with largest magnitude.

* * * * *